(12) United States Patent  
Schneider et al.

(10) Patent No.: US 7,996,436 B2  
(45) Date of Patent: Aug. 9, 2011

(54) MEDIA MANAGEMENT SYSTEM

(75) Inventors: Tina Schneider, San Francisco, CA (US); David Hoogstrate, San Francisco, CA (US)

(73) Assignee: Livebinders, Inc., Los Altos, CA (US)

( * ) Notice: Subject to any disclaimer, the term of this patent is extended or adjusted under 35 U.S.C. 154(b) by 0 days.

(21) Appl. No.: 11/526,495

(22) Filed: Sep. 25, 2006

(65) Prior Publication Data

US 2007/0130177 A1  Jun. 7, 2007

Related U.S. Application Data

(60) Provisional application No. 60/720,321, filed on Sep. 23, 2005.

(51) Int. Cl.
*G06F 7/00* (2006.01)
*G06F 17/30* (2006.01)

(52) U.S. Cl. .................. 707/802; 715/201; 715/713

(58) Field of Classification Search .................. None
See application file for complete search history.

(56) References Cited

U.S. PATENT DOCUMENTS

| | | | | |
|---|---|---|---|---|
| 6,081,262 | A | * | 6/2000 | Gill et al. .................. 715/202 |
| 6,910,049 | B2 | * | 6/2005 | Fenton et al. .............. 707/104.1 |
| 7,003,587 | B1 | * | 2/2006 | Battat et al. ................ 709/227 |
| 7,185,044 | B2 | * | 2/2007 | Ryan et al. ................. 709/200 |
| 7,363,593 | B1 | * | 4/2008 | Loyens et al. .............. 715/853 |
| 2002/0167538 | A1 | * | 11/2002 | Bhetanabhotla ........... 345/700 |
| 2003/0001873 | A1 | * | 1/2003 | Garfield et al. ............ 345/700 |
| 2004/0095379 | A1 | * | 5/2004 | Chang et al. ............... 345/727 |
| 2005/0193010 | A1 | * | 9/2005 | DeShan et al. ............ 707/104.1 |
| 2005/0223039 | A1 | * | 10/2005 | Kim et al. ................. 707/104.1 |

* cited by examiner

*Primary Examiner* — Khanh B Pham
*Assistant Examiner* — Azam Cheema
(74) *Attorney, Agent, or Firm* — Fliesler Meyer LLP

(57) ABSTRACT

Media management systems and methods are provided for authoring, managing, navigating, and collaborating electronic media. The media management systems and methods, collectively referred to herein as a Binder Presentation System (BPS), provide an application for presenting digital content that allows users to quickly create, manage, share and view rich media presentations under one unified interface to address the inadequacies of current slideshow presentation software. The BPS provides tools to users like teachers and business professionals for managing and presenting rich media content.

38 Claims, 17 Drawing Sheets

| | Icon | Type | Name | Date | Source | Copyright | Author | Notes |
|---|---|---|---|---|---|---|---|---|
| Tab 1 | | | | | | | | |
| | | image | Mytitle.jpeg | 12/23/05 | www.flickr.com | Me 12/23/05 | me | party |
| Sub-tab 1 | | | | | | | | |
| | | Txt file | Mytext.txt | 12/24/05 | C:/myfolder/mytext.txt | Me 12/24/05 | me | |
| | | spreadsheet | Mychart.xml | 1/05/06 | C:/myfolder/mychart.xml | John Smith 1/05/06 | John Smith | notes |
| Base-tab 1 | | | | | | | | |
| | | Link | www.google.com | 1/15/06 | www.google.com | Google | Na | |
| Tab 2 | | | | | | | | |
| | | image | mysunset.jpeg | 12/23/05 | C:/myfolder/mysunset.jpeg | Me 12/23/05 | me | placeholder |

Tab1 Tab2 Tab3

Binder Footer

MEDIA MANAGEMENT SYSTEM

RELATED APPLICATION

This application claims the benefit of U.S. Patent Application No. 60/720,321, filed Sep. 23, 2005.

TECHNICAL FIELD

The embodiments described herein relate to a media management system and, more particularly, to a media management system for navigating, authoring, managing, and collaborating electronic media for presentation.

BACKGROUND

PowerPoint from Microsoft® (Microsoft) is an example of a widely used presentation application or format for a variety of markets today. Currently, online companies like zoho.com and thinkfree.com are delivering simple, free versions of presentation slideshow tools like PowerPoint software along with presentation hosting solutions over the web. However, none of these applications are providing a better and more appropriate presentation vehicle to display digital content that lets a user present content in a seamless non-sequential manner.

PowerPoint was inspired by transparency projectors, and in a similar fashion presents one 'page' of information after another in a sequential slideshow-type format. Users click on 'forward' or 'backward' buttons or click on the slideshow page to advance to the next slide. PowerPoint then adds features like dynamic transitions, and embedding sound, movies and graphs that differentiate it from the transparency metaphor.

Although PowerPoint is the number one presentation tool in the market today, many end-users, like educators, do not use PowerPoint. Most can not take the time or money to train to use the software. Others can not afford the time that it takes just to create a slideshow. But more importantly teachers and other presenters find that PowerPoint digital slideshows are disruptive to a class or live audience presentation. The slideshow format does not allow a presenter to respond to the random way they need to move through content jumping from topic to topic as they respond to the way an audience is reacting to the presentation. For a teacher, not every class responds the same way to the same material. The same goes for other speakers as well.

Navigation in a presentation slideshow needs to be more flexible. In a typical PowerPoint presentation, if a speaker wants to jump to different slides that are not in the next sequence, the speaker has to fast forward to the 'right' slide or drop out of 'presentation' mode into 'edit' mode of the application, scan the thumbnail images to the 'right' slide and then launch back into 'presentation' mode. With transparencies, the speaker selects transparencies in any sequence before placing the selected sheet on the projector for the audience to view. In addition, it is becoming common for presenters to use video content, and content from websites outside of the presentation. The user will minimize the slideshow and open up the video file or open up the web page and then minimize those applications to return to the slideshow application. The presenter juggles between different applications to get their point across, losing the flow of narrative, the attention of the audience. They end up spending what little time they have opening and closing files instead of delivering the message. This becomes a disruption to the narrative, which is frustrating to the presenter and to the audience.

Managing embedded and linked content is also becoming a growing problem as documents attempt to use more and more rich media. With the onslaught of digital content available from the Internet, presenters are looking for ways to integrate more digital content into their presentation, but they do not have any way to track and manage this content. This content could be in the form of a video file streamed from the internet or from a desktop computer.

Although tools like PowerPoint give the author the ability to embed multiple file types, the slideshow format does not have any means of displaying to the author a way to track details of each embedded content file. For example, if a presentation is using two movie files, three (3) images and some text, the author has no way to track which files were imported into the slideshow. PowerPoint hides the media once it is bundled into the document file or, in the case of a movie file, creates an invisible link to the file on the desktop. There is not any method by which the author can know what that file name is or where it is being linked from on the desktop. This is a problem if the slideshow is being copied to another machine. If the author does not also copy the video file, the slideshow will not be able to play the video because it will not be able to locate the link. This is even more of a problem if the author is referring back to a file several months later and inadvertently deleted the movie file or moved that file into another folder unknowingly breaking the link between the slideshow and the content file. As a result, many presenters keep content out of the presentation materials and opt to provide the content by opening and closing web browsers and media files separate from the slideshow. This creates a disruptive experience for both the presenter and audience as the presenter moves between the slideshow application and the desktop to open and close different application windows.

With the current explosion of interest in 'Web 2.0', the media has been focused on the way user-generated digital content attracts social networks of young people on the Web. Many websites are providing simple web applications that allow the novice user to quickly create and host content for online viewing. Many of these companies offer content hosting for specific media. Youtube.com is a popular video file sharing site where consumers can upload personal movies clips that the public can view. Flickr.com is a popular image sharing and tagging site that lets amateur to professional photographers upload their images. Blogger.com is one of many text diary publishing sites where users can post pictures, movies and text. Also, Thumbstack.com and Zoho.com offer presentation tools for creating and presenting slideshow presentations online.

Many of these services present information in a single slideshow format method, sequentially presenting video, image or text. What is missing is a way to move beyond the slideshow format and introduce a more intuitive and much easier authoring and presentation environment. Consequently, there is a need for a media management system or platform that includes a presentation format that addresses a more seamless way to navigate through digital content in a more non-sequential manner.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

BRIEF DESCRIPTION OF THE DRAWINGS

FIG. 11 shows a Credits page of a Binder, under an embodiment.

DETAILED DESCRIPTION

Figure 1:
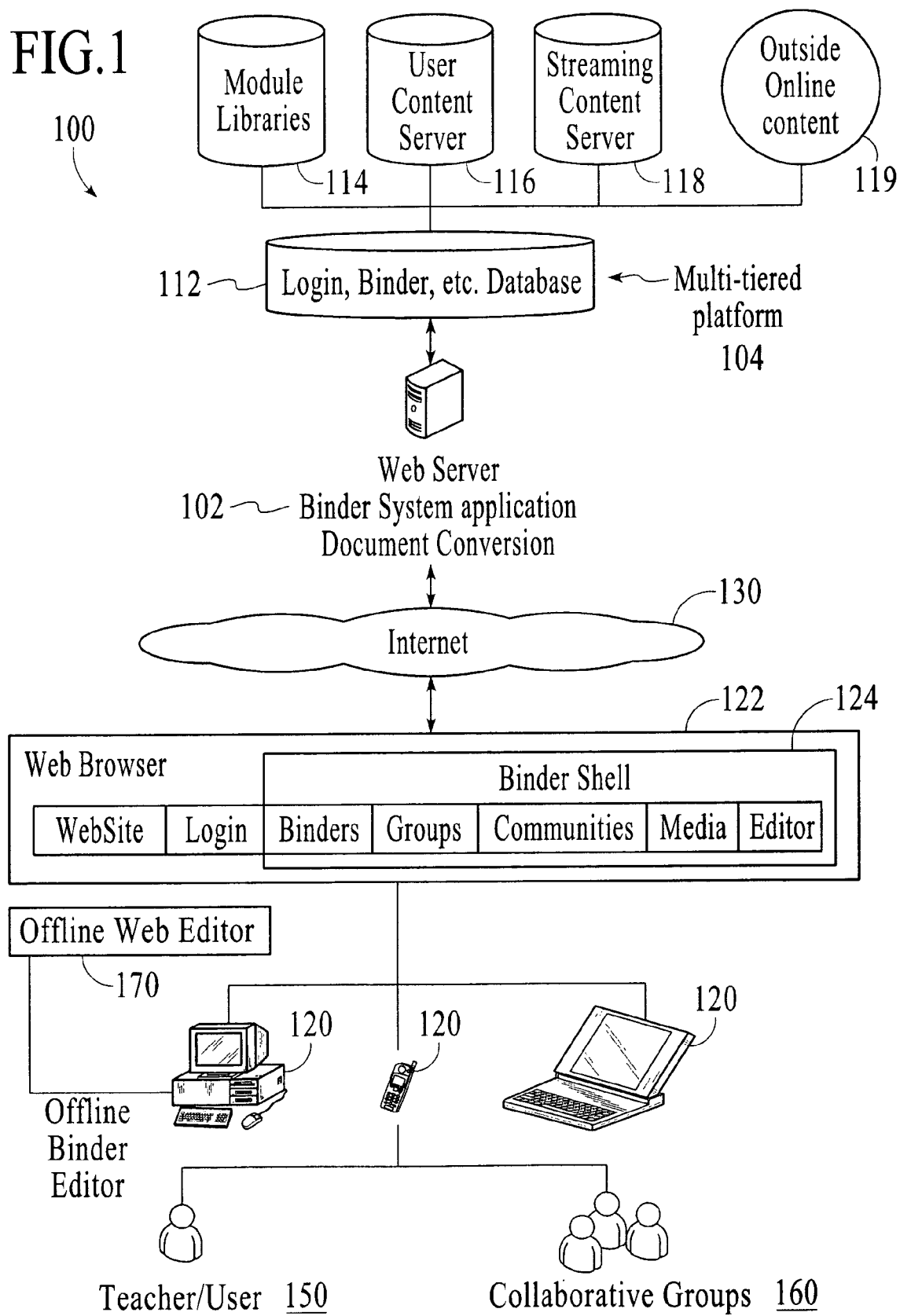
FIG. 1 is a block diagram of the Binder Presentation System (BPS) system, under an embodiment.

Media management systems and methods are described below for authoring, managing, navigating, and collaborating electronic media. The media management systems and methods, collectively referred to herein as a Binder Presentation System (BPS), leverage the popularity and ubiquity of the web browser to provide a web application for presenting digital content that allows users to quickly create, manage, share and view rich media presentations under one unified interface to address the inadequacies of current slideshow presentation software. The BPS provides tools to users like teachers and business professionals for managing and presenting rich media content.

Delivering a smoothly run narrative is an important part of any presentation because it validates the competency of the messenger and helps to keep the audience engaged. Unexpected hurdles in a presentation offer the risk of losing the attention of the audience. This can make or break a sales presentation or a class lecture. Some examples include misplacing content and having to look around a computer desktop to find it, or having to deal with broken links where files that were attached to the slideshow are no longer available. Although technology is designed to simplify the presentation process, it seems like it has done just the opposite by making it harder to find and keep track of media through an endless sea of invisible file links and inflexible designs.

One of the ways in which software applications can help the presentation process is to simplify the navigation of content into a seamless user interface. The BPS described herein incorporates a multiple level tabular document format with an integrated technology platform and rich media presentation hosting service that provides an interface technology that organizes multiple types of media files into a seamless tabular framework that is simple to author, navigate, present, and share.

The media of an embodiment includes one or more media objects like images, text, and video to name a few. Furthermore, the media includes media that uses electronic or electromechanical energy for the end user (audience) to access the content. This is in contrast to print media, which is most often created electronically, but does not require electricity to be accessed by the end user in the printed form. The primary electronic media sources include video recordings, audio recordings, multimedia presentations, slide presentations, Compact Disk Read-Only Memory (CD-ROM), and online content. Although the term is usually associated with content recorded on a storage medium, recordings are not required for live broadcasting and online networking. Any equipment used in the electronic communication process (e.g. television, radio, telephone, desktop computer, game console, handheld device) can also be considered electronic media.

In addition to embedding traditional media objects like images, text and video the BPS also simplifies the presentation process by embedding dynamic content. Dynamic content includes web applications that require user input and returns server feedback. Some examples include but are not limited to electronic mail (email), instant messaging, Really Simple Syndication (RSS) feeds or weblogs (blogs) (alternatively referred to as Rich Site Summary and Resource Description Framework (RDF) Site Summary), map requests, search, surveys and games. Dynamic content also includes video content streamed from another server (e.g. youtube.com, images from flickr.com, content directly from within a company or school intranet server, etc.). In addition, dynamic content can include learning modules such as plug-ins generated and/or provided by the host of the BPS to facilitate the explanation of complex topics. An example is a three-dimensional (3D) globe application provided by the BPS host to help teach concepts such as latitude and longitude for students.

In the following description, numerous specific details are introduced to provide a thorough understanding of, and enabling description for, embodiments of the BPS. One skilled in the relevant art, however, will recognize that the system and methods of the BPS can be practiced without one or more of the specific details, or with other components, systems, etc. In other instances, well-known structures or operations are not shown, or are not described in detail, to avoid obscuring aspects of the BPS.

FIG. 1 is a block diagram of the Binder Presentation System (BPS) system 100, under an embodiment. The BPS 100 is an online content-hosting platform that hosts or runs the Binder authoring, presentation hosting, content management and collaboration component. The BPS 100 includes at least one Binder Server 102 coupled to a multi-tiered platform 104. The multi-tiered platform 104 includes one or more of databases, libraries, and servers to name a few. As an example, the multi-tiered platform 104 of an embodiment includes a database 112 for storage of BPS 100 information like user login information and binder information. The multi-tiered platform 104 also includes module libraries 114 for use in generating or manipulating Binder content, the module libraries 114 provided by a host provider of the BPS 100 and/or other software component distributor. The module libraries 114 include customized modules that add further functionality to the BPS 100. These modules are treated like separate media objects that users can import as easily as media files directly into Binders. Examples of modules include, but are not limited to the following: line, circle and bar graphing modules; 3D mapping modules; two-dimensional (2D) mapping modules; quiz modules; slideshow modules; and context sensitive search modules.

The multi-tiered platform 104 further includes a user content server 116 for processing media content uploaded into the Binder by a user. Moreover, the multi-tiered platform 104 includes a streaming content server 118 for processing video media content uploaded into the Binder by a user. The multi-tiered platform 104 also allows the integration of content streamed from an outside server or environment 119. Users can include video streaming of the content or other web based content such as web pages, RSS feeds, online word documents, and spreadsheets, etc directly into the Binder from the outside server 119. The database 112, module libraries 114, user content server 116, streaming content server 118, and streaming content from outside servers 119 of this example embodiment are coupled to the Binder Server 102 but are not so limited.

The Binder Server 102 and components of the multi-tiered platform 104 described herein are processor-based components running or hosting numerous applications or programs. As such, the Binder Server 102 and components of the multi-tiered platform 104 can include one or more processors (not shown) coupled among any number/combination of components (not shown) known in the art, for example buses, controllers, memory devices, and data input/output (I/O) devices, in any number of combinations.

The BPS 100 includes one or more client devices 120 that are coupled to the Binder Server 102 via at least one network coupling or connection. The network coupling of an embodiment is the Internet 130, but one or more other couplings or combinations of couplings can be used. Users access the BPS 100 via the network coupling (e.g. Internet) 130 using a web browser 122 hosted on their client devices. The web browser 122, when coupled to the BPS 100, presents a login page to the user. Registered users authenticate with the BPS application 100 using the login page in order to access their personalized content. Users' authentication credentials are encrypted and stored in the database 112. Non-registered users can access the BPS application 100 but will see only the public content of the system. Registered users have full control over the accessibility of the content they create.

The client devices 120 described herein include processor-based electronic devices, for example, cellular telephones, personal computers, portable computing devices, portable telephones, portable communication devices, subscriber devices or units, personal digital assistants (PDAs), mobile devices, wireless devices, wireline devices, voice over Internet Protocol (VOIP) devices, private branch exchange (PBX) devices, soft clients, and desktop clients to name a few. The client devices 120, also referred to as handsets, client devices, mobile devices, mobile communication devices, and portable communication devices, can include all such devices and equivalents, and are not limited to the communication devices described above.

The couplings or network couplings or connections 130 include wired couplings, wireless couplings, and hybrid wired/wireless couplings, but are not so limited. Furthermore, the couplings can include various networks and/or network components (not shown) of a communication service provider or carrier, but are not so limited. The network and corresponding network components, when present in the couplings can be any of a number of network types known in the art including, but not limited to, local area networks (LANs), metropolitan area networks (MANs), wide area networks (WANs), proprietary networks, backend networks, and the Internet.

Figure 2:
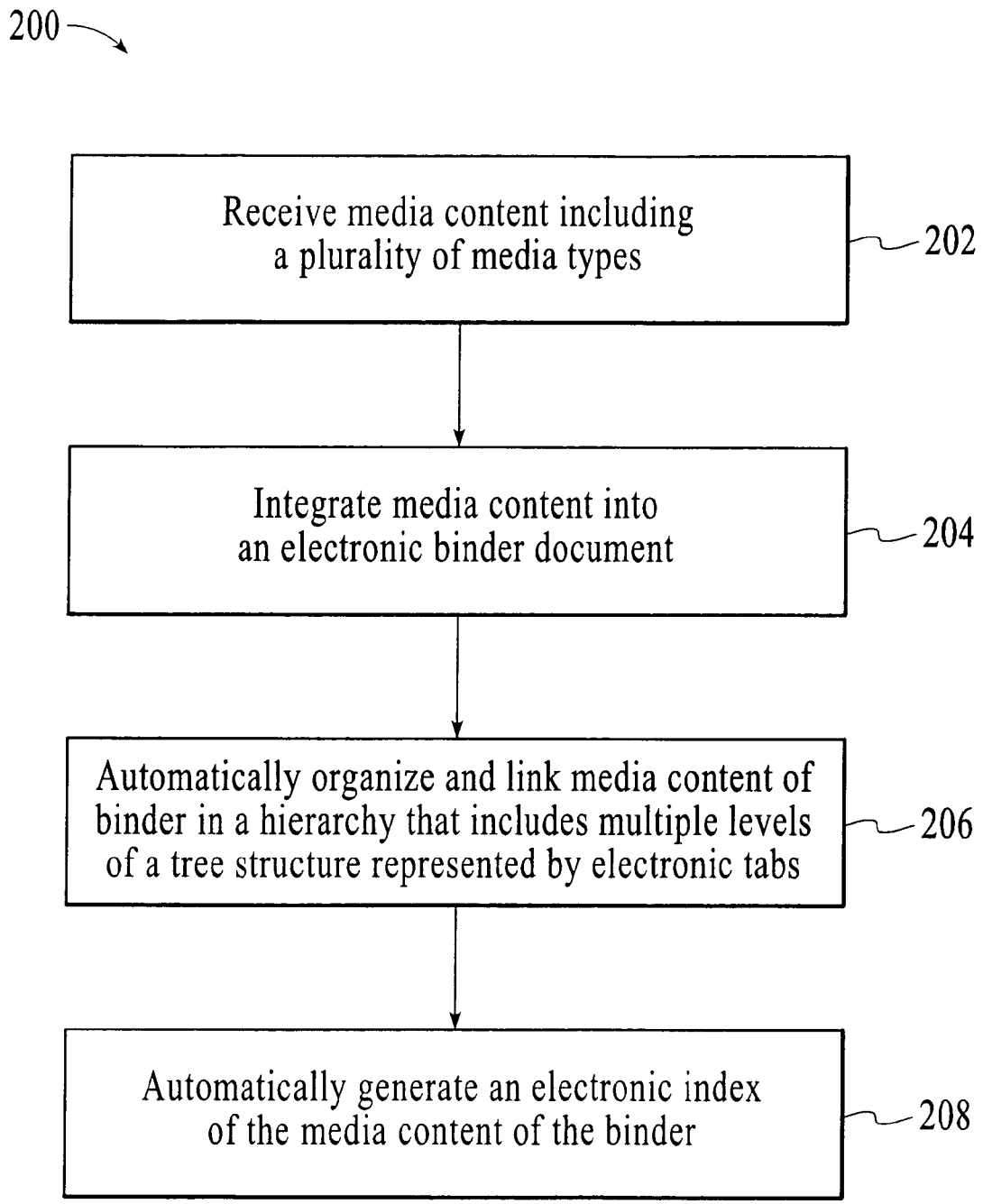
FIG. 2 is a flow diagram for managing media content, under an embodiment.

FIG. 2 is a flow diagram 200 for managing media content, under an embodiment. The management of media content includes receiving 202 media content that includes multiple media types. The received content is integrated 204 into a binder; the binder is an electronic document. The management of media content includes automatically organizing and linking 206 the content of the binder in a hierarchy that includes multiple levels of a tree structure. The levels of the tree structure are represented by multiple electronic tabs. An electronic index of the content of the binder is automatically generated 208. The electronic index is organized according to the hierarchy. The electronic index includes one or more of information of an electronic source of the content, properties of the content, authorship information of the content, and rights regulating use of the content. The electronic index is represented by one of the electronic tabs.

Referring to FIG. 1, the Binder Server 102 presents a Binder Shelf 124 to authenticated users 150 or collaborative groups 160 via the web browser 122, when the client device 120 of the user 150 is coupled to the BPS 100. The Binder Shelf 124 includes one or more of "Binders", "Groups", "Communities", "Media", and "Editor" applications, each of which is described below.

A registered user 150 creates or generates a Binder using the Editor of the BPS 100. The Editor, also referred to as the Editor application, is a web-based application that is loaded over the coupled network (e.g. Internet) 130 and runs within the client browser 122. The Editor uses a data interchange format object to represent a Binder. As a more specific example, the Editor application is written in JavaScript (JS) and uses a JS Object Notation (JSON) object to represent a Binder. The JSON object is retrieved or fetched from the BPS database 112 when the user loads a Binder, manipulated in memory as the user edits a Binder, then returned back into the database when the user saves a Binder. An Asynchronous JS and Extensible Markup Language (XML) (AJAX) engine of the Editor application makes periodic calls back to the BPS application for user interface (UI) and content components that are subsequently cached in the client browser.

Existing Binders can be viewed using a Tab mode, Presentation mode and/or Edit mode (for further editing). The Tab mode is the BPS default mode of an embodiment, but the BPS is not so limited. Both modes retrieve the Binder JSON object from the database 112 for rendering in the client browser 122. When the user interacts with the Binder tabs (Tab mode) or moves forwards/backwards in the presentation (Presentation mode) content is loaded from the content server layer of the Binder Server 102. Predictive fetching and caching of content gives the user a responsive experience that is typical of traditional standalone applications.

The BPS 100 includes the Binder Shelf application or page 124 (also referred to as a Shelf or Account) where users manage their Binders, Groups, Communities and Media. The top level of the platform shows or displays numerous tabs; as an example the tabs include 'My Stuff,' 'Binders,' 'Groups,' 'Communities' and 'Media' tabs. Binders can be marked for viewing as either Private or Public, and organized into Groups or Communities created by the user as described in detail below. Any user can view Public Binders. Private Binders can be viewed from the users account or as part of private Groups and Communities. Groups 160 include one or more invited members (registered users) with any number of Binders assigned to a Group 160. An example includes a teacher creating Groups for each class or class project. Communities are also created by users and can host any number of members, Groups and Binders. A school for example can have a community of users, Groups, Binders and Media. The Media tab includes a list of all public or private media files that have been uploaded or linked in a Binder. Media content includes user content, BPS proprietary content or third party content. Users can re-use and share content from the Media hosted library.

The Binder, also referred to as a Binder document, is a multi-layered tabbed document generated through use of the Editor. The Binder includes information of the layout tags, media files, properties of the media, and UI parameters of the corresponding content. The Binder is viewed through web browser applications and functions to organize the media content using three tab layers. The three tab layers include first level tabs, or main tabs, second level tabs, or sub-tabs, and third level tabs or base-tabs. The BPS of alternative embodiments can include any number of tab layers and is not limited to three tab layers.

The Binder navigation interface of an embodiment uses the tabs to separate content. Each tab can support sub-tabs for more content depth. Individual tabs can also display the content in a single panel or with multiple panels under a single tab. The tabular interface gives the user a flexible way to navigate through the content.

The BPS 100 provides dynamic tab creation and sub-tab creation. To provide an efficient user experience in creating content or organizing lectures, the BPS 100 uses an automated tabbing method to represent different types of content in a body of text. Where in most HyperText Markup Language (HTML) editing environments users insert tabs one by one as they design the web page layout, the BPS 100 instead includes a rule-based system that automatically parses content and associates the content with one or more types or levels of tabs. Thus, the BPS 100 generates a complete layout including tab titles and imports files for each tab by interpreting an imported text outline, body of text, and/or a set of media objects as described in detail below.

Figure 3:
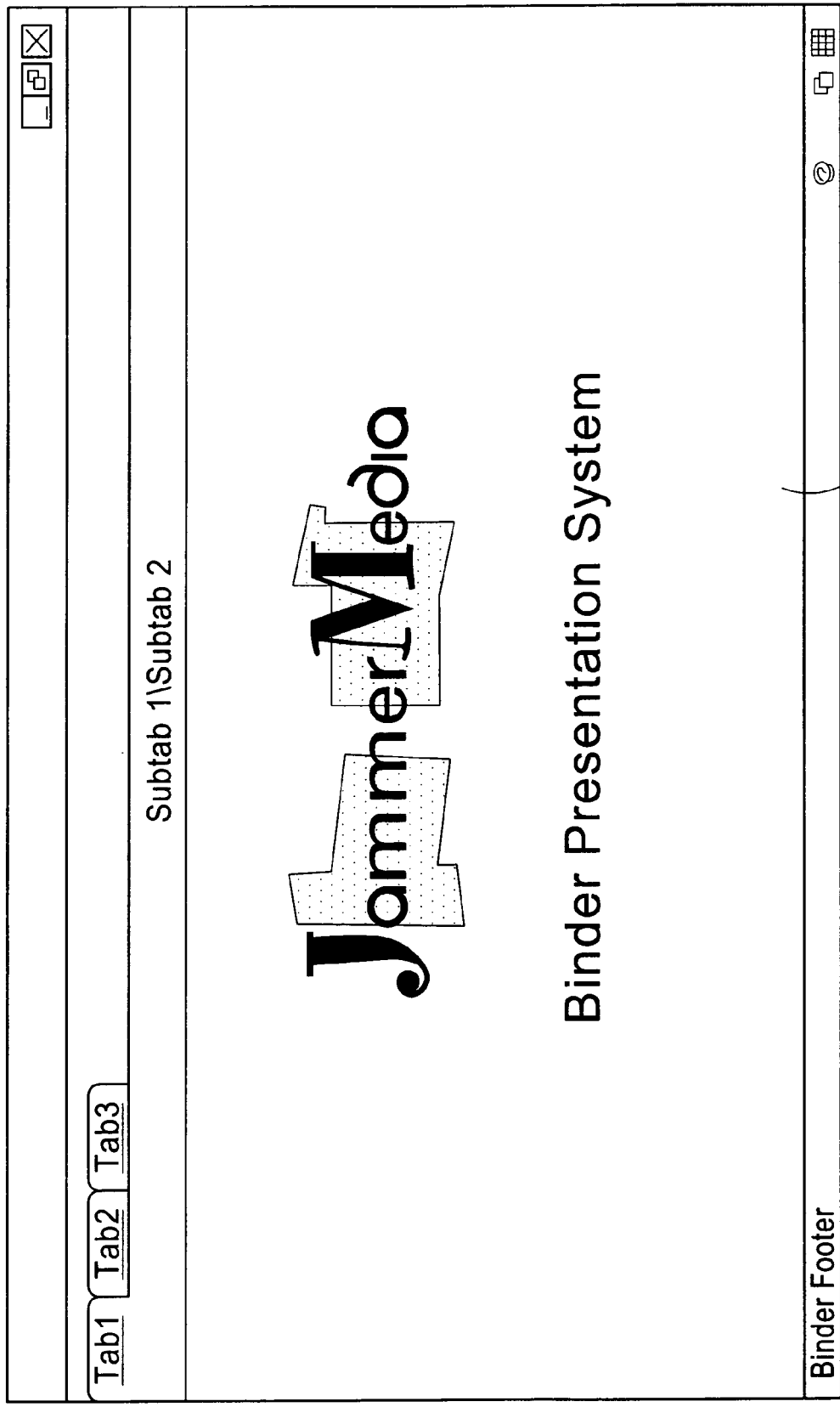
FIG. 3 shows a Binder in Tab mode showing content of the main tab (e.g. Tab 1), under an embodiment.
Figure 4:
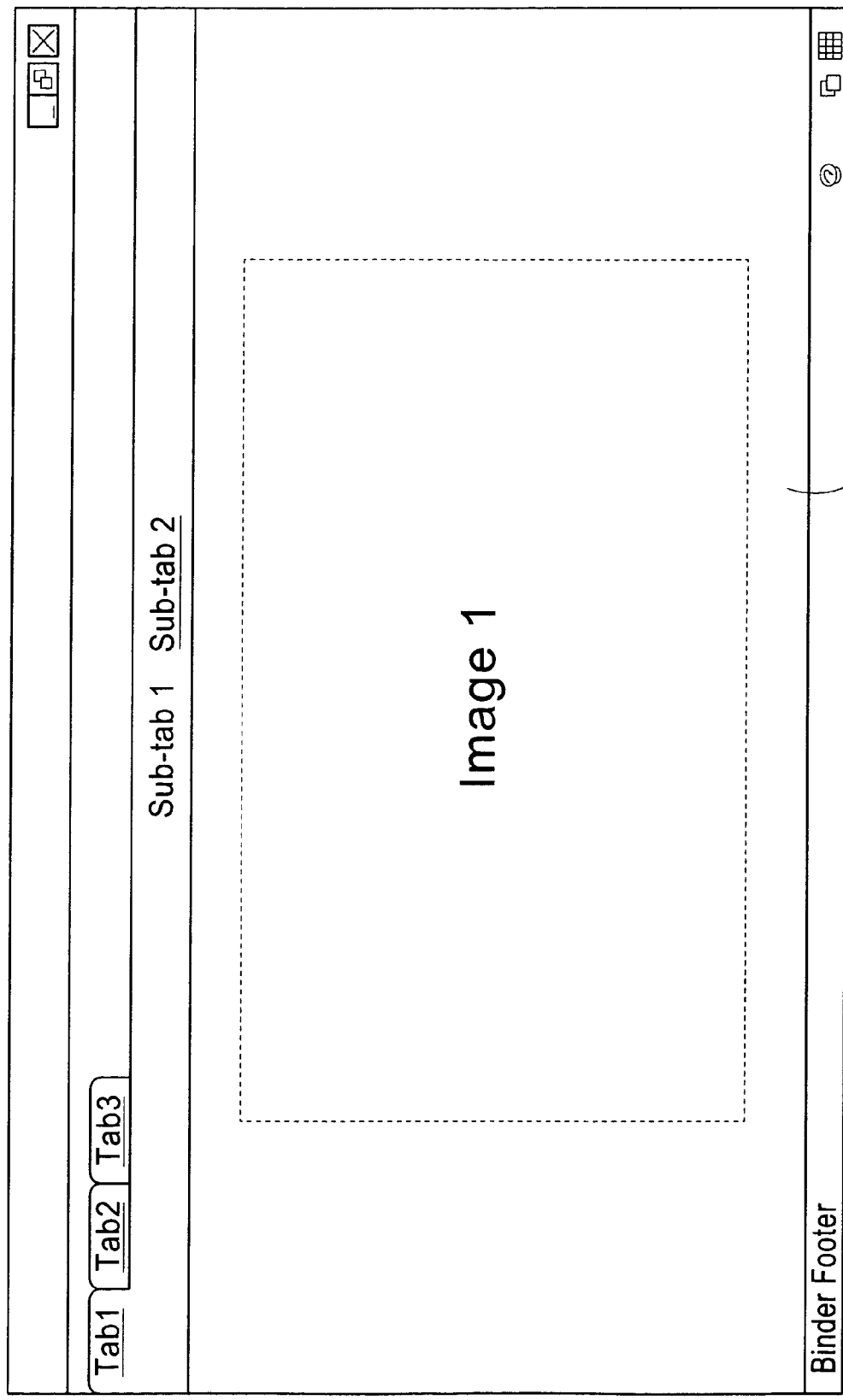
FIG. 4 shows a Binder in Tab mode showing content of a first sub-tab (e.g. sub-tab 1), under an embodiment.
Figure 5:
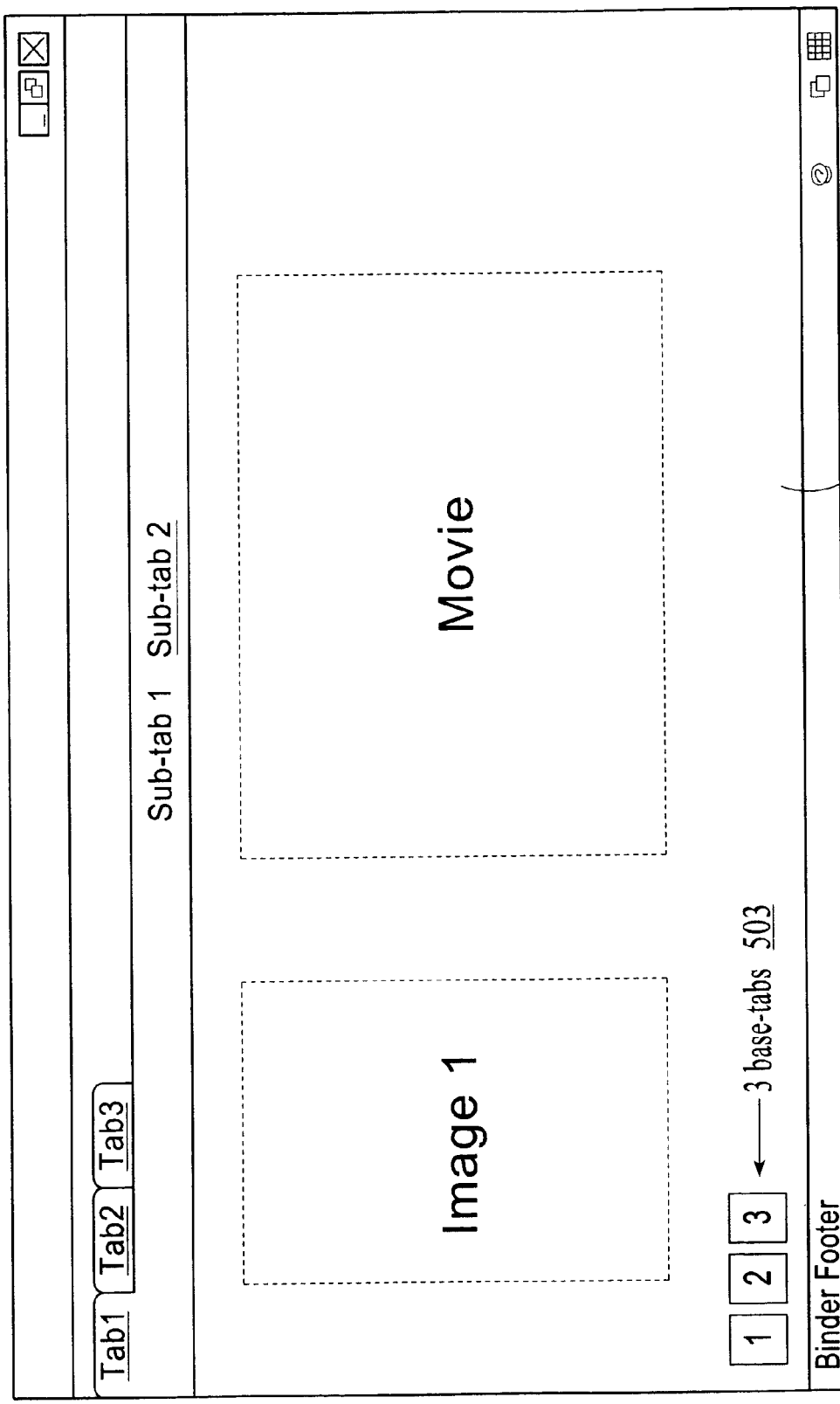
FIG. 5 shows a Binder in Tab mode showing content of a second sub-tab (e.g. sub-tab 2), under an embodiment.
Figure 6:
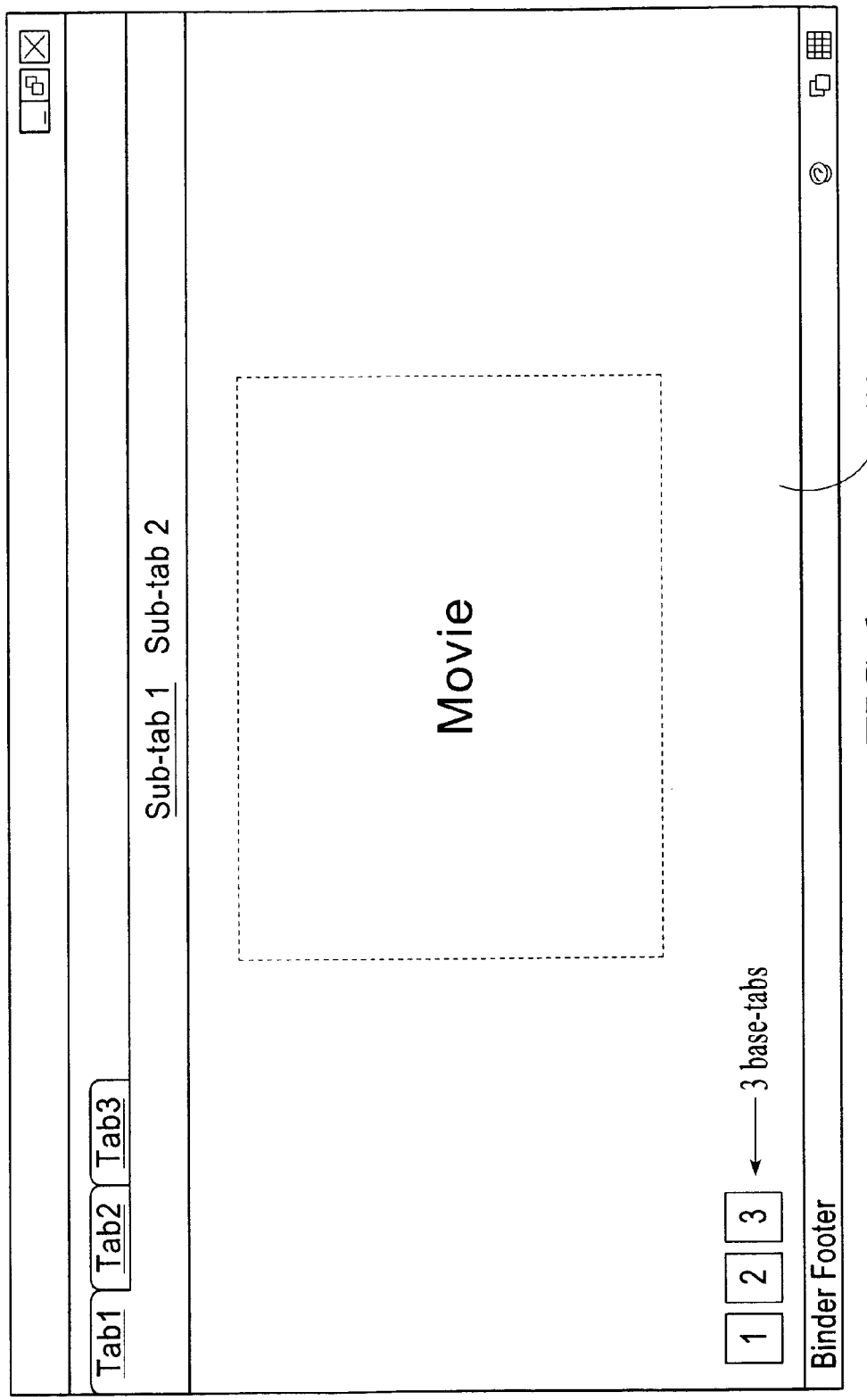
FIG. 6 shows a Binder in Tab mode showing content of a first base-tab (e.g. "base-tab 1") of the second sub-tab (e.g. sub-tab 2), under an embodiment.

Each tab of a Binder includes a tab page of content followed by the next tab structure. FIG. 3 shows a Binder in Tab mode showing content 300 of the main tab (e.g. Tab 1), under an embodiment. The main tab content of this example is a title page that includes two sub-tabs (e.g. "subtab 1" and "subtab 2"). FIG. 4 shows a Binder in Tab mode showing content 400 of a first sub-tab (e.g. sub-tab 1) of the main tab, under an embodiment. The content 400 of the first sub-tab include an image (e.g. "Image 1"). FIG. 5 shows a Binder in Tab mode showing content 500 of a second sub-tab (e.g. sub-tab 2) of the main tab, under an embodiment. The content 500 of the second sub-tab include an image (e.g. "Image 1") and a movie (e.g. "Movie"). The second sub-tab also includes three base-tabs 503. FIG. 6 shows a Binder in Tab mode showing content 600 of a first base-tab (e.g. "base-tab 1") of the second sub-tab (e.g. sub-tab 2), under an embodiment. The content 600 of the first base-tab include a movie (e.g. "Movie").

Figure 7:
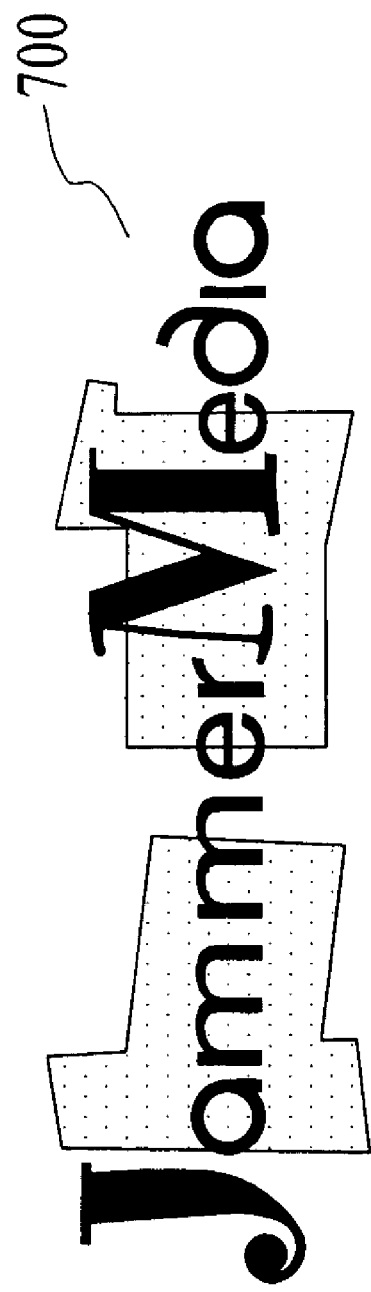
FIG. 7 shows content of the main tab (e.g. Tab 1) of a Binder in Presentation mode, under an embodiment.

Users can hide the tab buttons by selecting a Presentation icon of the Binder to launch the Binder content in Presentation mode. The Presentation mode of the Binder displays content for the currently selected tab without the tabs showing. FIG. 7 shows content 700 of the main tab (e.g. Tab 1) of a Binder in Presentation mode, under an embodiment. Presenters can then use an input device of their client device to move through the next series of tab content according to a sequential pattern of the hierarchy organizing and linking the client; the input device includes for example "arrow" keys, a cursor, and/or other joystick device. The sequential order of movement through the Binder content is based on the hierarchy of the tabs. Main tabs are followed by content or sub-tabs which are then followed by content for the base-tab, and so on. The 'Down arrow' key(s) move the user to the next tab layer down so that if a user were on level one the next level is the sub-tab level (e.g. sub-tab 1) and the next level beyond the sub-tab level is the base tab level. The 'Up arrow' key(s) move up one level in the tabs. Using the 'forward' and 'back' arrow keys moves horizontally through the series of tabs at that level. In one embodiment different colored borders or icons and numbers along the edge of the presentation page can visually help the user identify different tab levels. For example, a yellow border could indicate the first tab level, orange a second level and beige the base or third level. As users navigate through content in presentation mode, they can use the colors and number system to help them visually determine where they are in the hierarchy and whether they need to move up, down or left and right. Presenters wanting to break out of 'Presentation' mode can exit the mode and return to the Binder tabbed interface at exactly the position they left in the slide.

In addition, as users move through the tabs, sub-tabs and content within the tabs, the BPS tracks the tab state in each tab so that when a user returns to a previously visited tab the BPS returns the user to the same spot. This is helpful when a presenter must leave a tab setting to find content in another tab and then wants to return to the last position in the last tab. For example, a teacher may show a diagram in the position main tab 1, sub-tab 3. A teacher may want to stress a point by showing an image in main tab 2, sub-tab 4. After showing the image the teacher may want to return to main tab 1, sub-tab 3; rather than selecting tab 1 and then sub-tab 3 the BPS automatically sets the main tab 1 position at sub-tab 3. If the teacher needs to return to the image in main tab 2, sub-tab 4 the teacher need only select main-tab 2 to return to sub-tab 4. This saves the user time in finding their way back to a previously viewed position in a particular tab.

Tabs are used as navigational buttons that help distinguish certain parts of conventional web page documents in web browser application. In a spreadsheet software application like Microsoft Excel, different parts of the spreadsheet document are represented by tabs called 'worksheets.' In a diagramming tool like Microsoft Visio, different diagrams are also represented by tabs known as 'pages.' Tabs in an Adobe PDF document identify parts of the Acrobat Reader interface. This includes a table of contents tab known as 'Pages,' which automatically displays the headings of the PDF document as either a table of contents or as thumbnails of the individual pages. Another tab includes the 'Bookmarks' tab that highlights special places in the document. A third tab is the 'Comments' tab where reader's can insert comments about the document, and the fourth tab is an 'Attachment' tab where all external files are attached as part of the PDF document—similar to attachments in an email.

The Binder uses a hierarchical tree structure to better organize multiple layers of content for displaying information in a presentation format and is unlike conventional presentation tools. The content in the Binder is organized and linked according to three different layers of information and allows users to organize content with a tree structure of tabs, sub-tabs and base-tabs.

The multi-layered tab document is differentiated from conventional presentation formats because it provides a hierarchical layer of tabs on top of the slideshow document. This gives the Binder presentation a flexible navigation without compromising the flow of a presentation. This layer of tabs is one of the unique navigational components of the BPS. In a 19 page PowerPoint slideshow, for example, a user would have to forward through 13 other slides in order to get to slide 14. The other alternative would be to escape from the presentation mode back to the PowerPoint Editor and use the thumbnail sidebar to locate slide 14, and then launch again in presentation mode. This can be a sloppy way to move around in a presentation and is even more disruptive to the narrative flow.

Using the Binder, the user can choose to launch the presentation in Tab mode and use tab buttons to move through different parts of the presentation to get to slide 14. Alternatively, in Presentation mode all Binder tab, sub-tab and base-tab content are navigated through the use of arrow keys and mouse clicks. This allows the presenter to present content full screen in a sequential manner. In contrast to conventional media presentation tools, the BPS allows the user to navigate through the layers of the tab structure to move randomly or sequentially through the presentation. A user of the BPS can therefore navigate sequentially through a series of content by clicking forward on the arrow keys or mouse clicks on the page—similar to a slideshow presentation but now following a hierarchy of tab layers rather than a single layer of slides.

For example, if the user starts at the main level of tabs at position tab 1, she will move through the content in that tab and next to any sub-tab content followed by any base-tab content. Then, the sequence moves to the next main tab content of tab 2 followed by any sub-tab content and then base-tab content and so forth. However, if the user wants to jump randomly to different tabs in the presentation, she can escape out of Presentation mode and use the tab buttons, or use the arrow 'up' and 'down' keys to move through the layer of tabs intuitively without the visibility of the tab buttons. For example, if a user was on tab 1, sub-tab 2 and wants to view a movie located in tab 3, sub-tab 4 the user selects the 'up' arrow key to move up to the first level of main tabs. Since the user was on tab 1, she then moves two 'forward' or 'left' arrow keys to tab 3. The user then selects the 'down' arrow key once to get to the sub-tab level and then moves three times using the 'left' arrow key to get to sub-tab 3.

Figure 8:
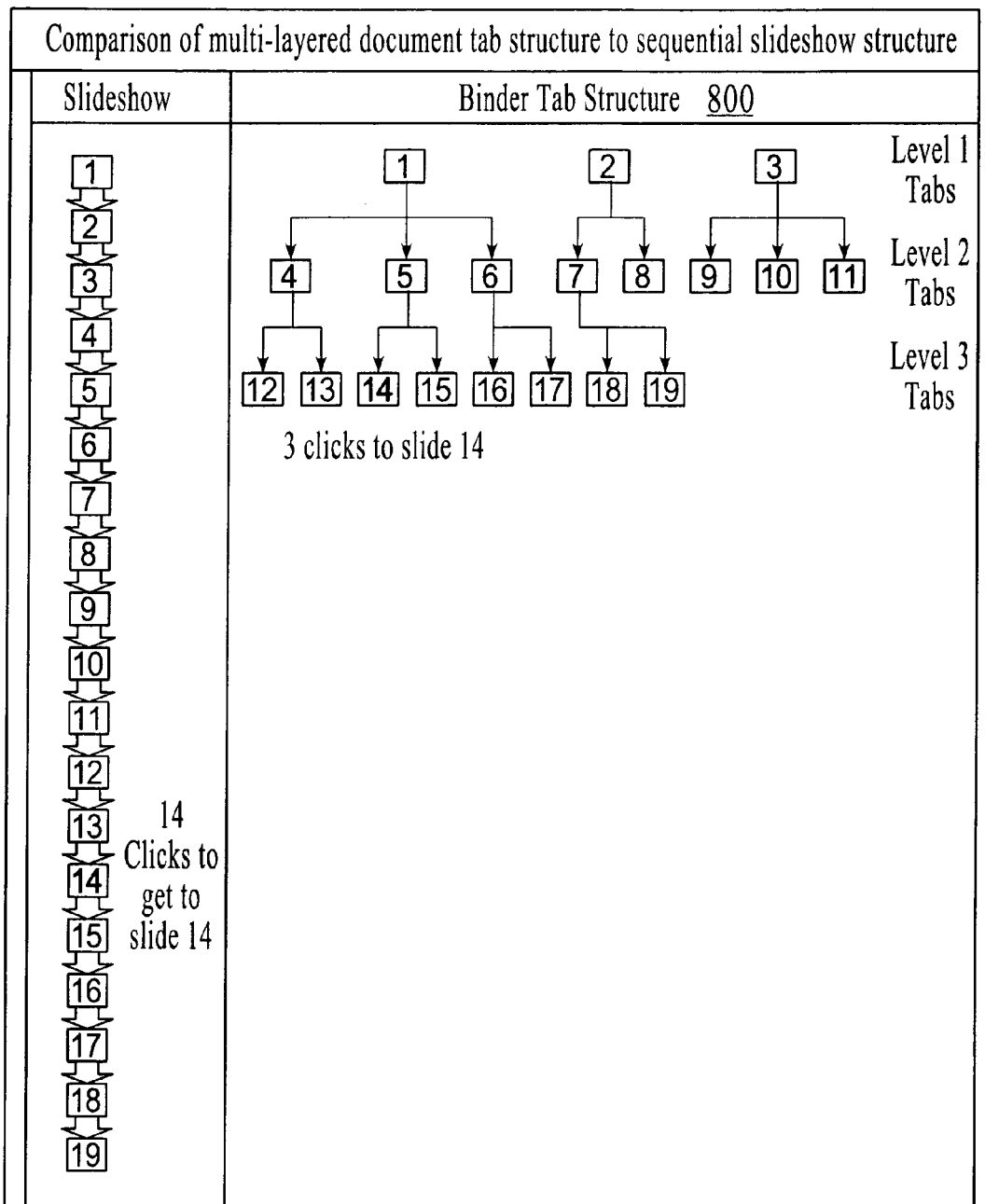
FIG. 8 shows a comparison between a Binder multi-layered navigational tree structure of the BPS and the conventional navigational structure of a slideshow presentation document, under an embodiment.

FIG. 8 shows a comparison between a Binder multi-layered navigational tree structure 800 of the BPS and the conventional navigational structure 10 of a slideshow presentation document, under an embodiment. Using PowerPoint as an example the slideshow 10 represents a 1 to N relationship between the number of slides and the paths that the user must take to jump to that slide. In the Binder Tab mode, because the content is organized within a tab tree structure format 800 that, in this embodiment, includes three (3) layers, the number of steps needed to get to a particular slide is minimized by the number of layers in the hierarchy. Therefore, in the case of the 19 slide example, it takes the speaker three (3) steps to get to slide 14 using the tree structure 800. This is in contrast to the 13 steps required to reach slide 14 under a traditional linear structure (slideshow) 10 format. Thus, the tabular tree structure format 800 is a more efficient and spatial way to represent multiple layers of content in a single document file.

The Editor is the authoring application for the Binder. The Editor of an embodiment is a web application with modular components that can be customized to deliver and retrieve data to and from the Binder Server. The Editor provides an interface to create templates and Binders. The Editor provides mechanisms for designing the layout, components, media, their interactions, rules, etc. that govern the Binder. The Editor is responsible for loading and displaying BPS Binders and project files.

The Editor provides the Binder's unique features such as the Binders hierarchical tabular structure, and all of the Binder tab page layouts and settings as described herein. The Editor also automatically tracks all of the media content embedded or linked in the Binder and displays that information on the Credits page that is included in the Binder, as described herein. The Editor is configured to simplify the authoring process with a series of import and drag and drop features and automated document conversion and indexing components.

Figure 9:
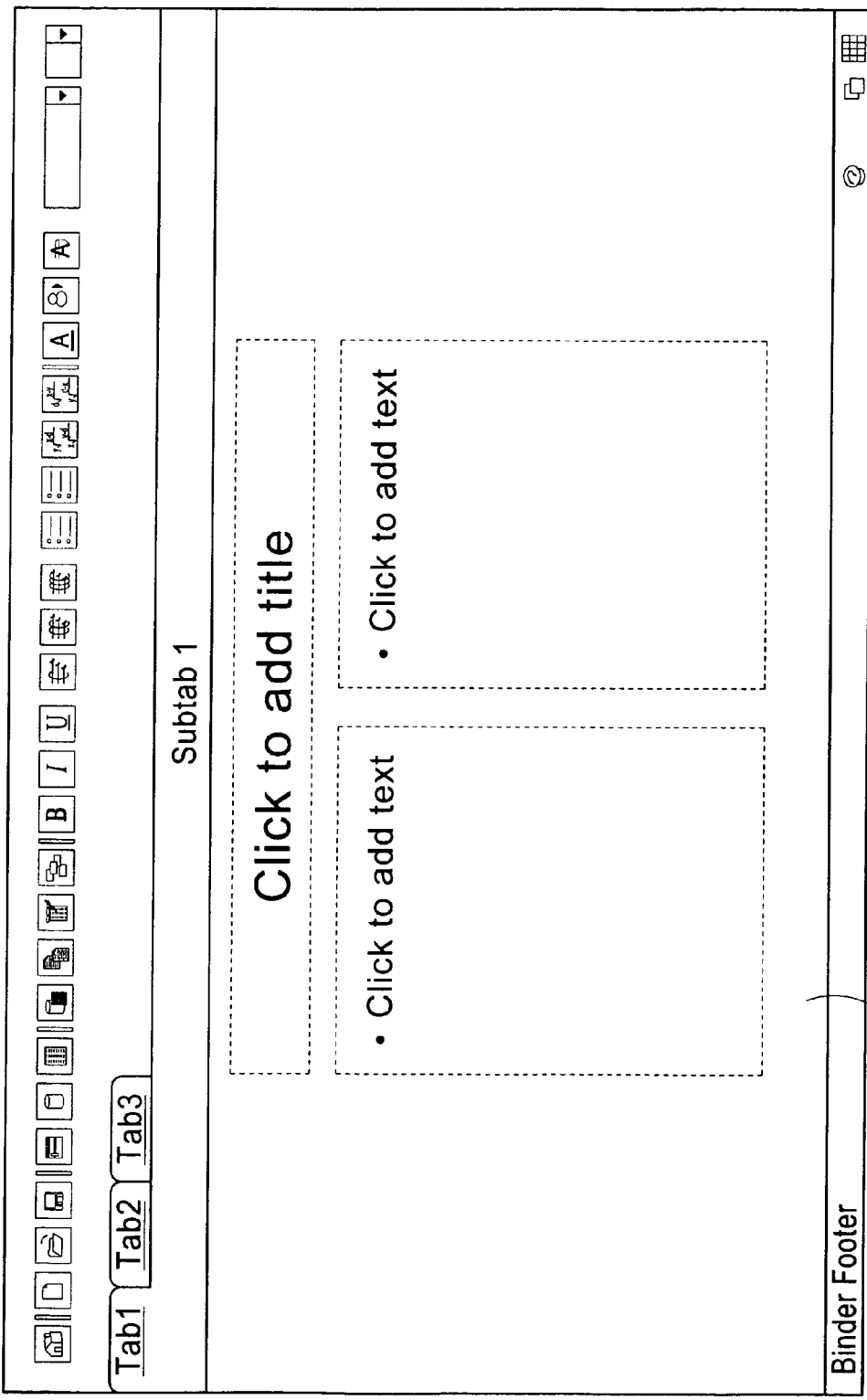
FIG. 9 shows a Binder Editor in Tab mode showing a content template of the main tab (e.g. Tab 1), under an embodiment.

To create a Binder the user selects an icon (e.g. Create Binder icon) from a tab (e.g. Binder tab) on a page provided by the Binder server to the client device web browser. In response to this selection, the Editor application launches inside the client device web browser. Users can configure or set the layout of the Binder, including selecting a number of tabs and sub-tabs, along with parameters like single or double frame, etc. Users can then upload media, and embed media, plug-ins, links and web pages within tab headings. Binders are automatically saved on the Binder server. FIG. 9 shows a Binder Editor in Tab mode showing a content template 900 of the main tab (e.g. Tab 1), under an embodiment. The main tab of this example includes one sub-tab (e.g. "sub-tab 1").

Figure 10:
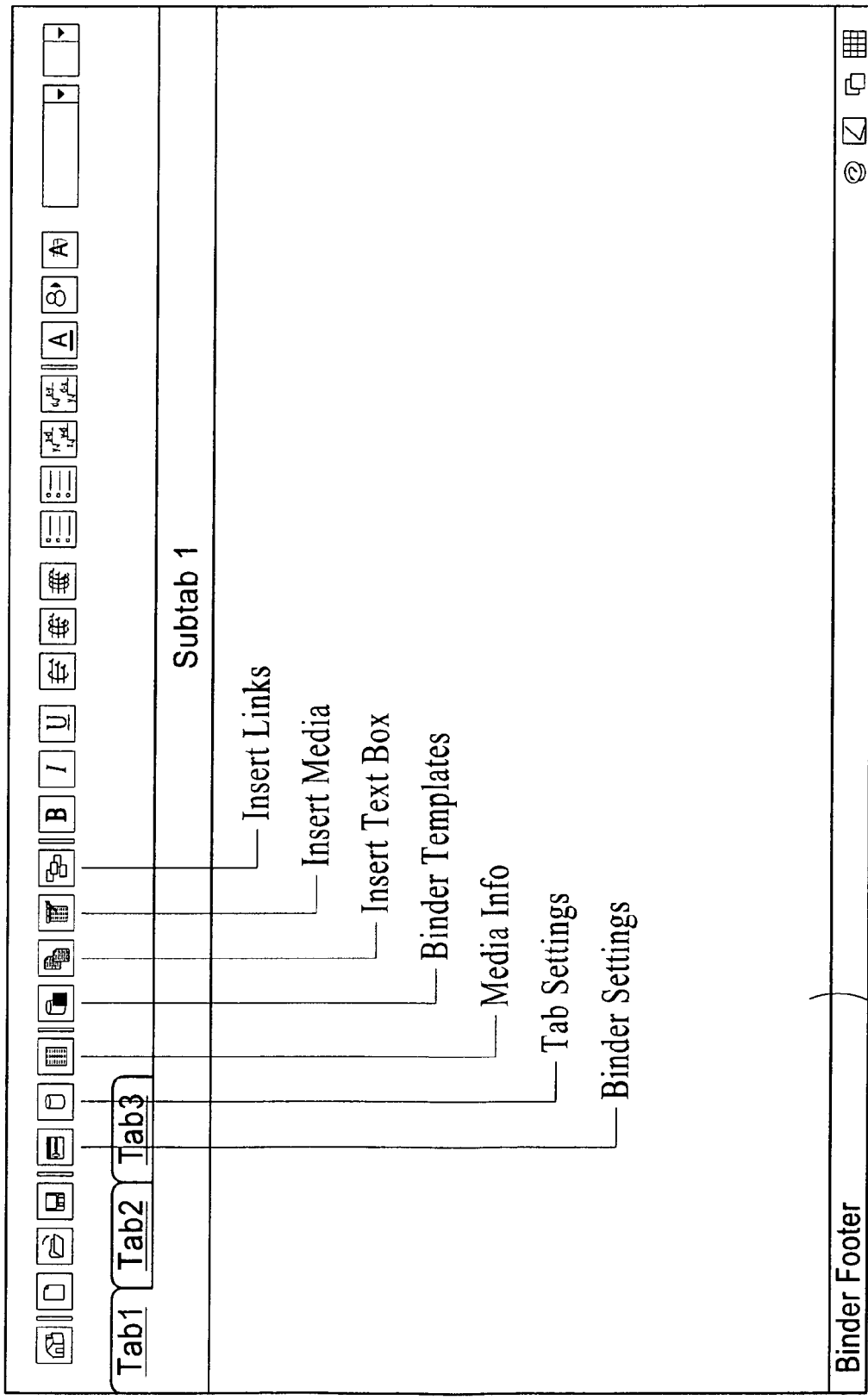
FIG. 10 shows a Binder Editor page including description tags, under an embodiment.

The Editor includes multiple sections or groupings. The sections include but are not limited to File Settings, Binder Settings, Tab Settings, Media Info, Binder Templates, Insert Text Box, Insert Media, and Insert Links. FIG. 10 shows a Binder Editor page 1000 including description tags, under an embodiment. The File Settings allow the author to save the Binder to the Binder server or to the client device, or opens pre-existing Binders. The Binder Settings include selections for background color, font, publishing parameters, internationalization, Sharable Content Object Reference Model (SCORM) compliancy, etc. Tab Settings include selections for renaming, adding, and/or deleting tabs, sub-tabs and base-tabs, etc., as well as the labels for those tabs. Media Info includes information about the uploaded media with areas for notes, copyright information, tagging properties for search and authorship information, etc. Binder Templates include layout pages to apply as appropriate to each selected tab or sub-tab. The Insert Text Box provides for insertion of text boxes to a tab page. The Insert Media function includes the ability to import, link, embed or convert files to embed in the Binder.

Conventional authoring applications allow users to create tabs as they need them by inserting and adding tabs using an 'insert' selection of a menu bar or by using the mouse click action. In contrast, the BPS Editor provides for a relatively simple automated way to create tabular presentations. To save a user time in creating presentation content or organizing lectures, the BPS of an embodiment includes an automatic tabbing component for representing different types of content in a tabbed document. The tabbing component uses a rule-based system to perform tab conversion but is not so limited. The tab conversion converts text content including one or more of document headings and tables of content into a set of media objects, and labels the media objects with their own tab page. This rule based system is a component of the editing and player feature in which content can be automatically divided and represented by tabs and sub-tabs.

As an example, the Editor uses a text-based outline to create the Binder layout. The Editor imports a text file in an outline format or as a body of text, and interprets outline headings and/or paragraph key words, and divides the Binder into the appropriate number of tabs. For example, if a text document has an outline with three (3) main headings (e.g. headings titled 'Intro', 'Body' and 'Conclusion') the BPS Editor automatically creates three (3) main tabs with those titles. The body of text or content of the outline that falls under each heading that appears under each appropriate tab.

As another example, the BPS imports a set of media files such as a text file, image file, and movie file and automatically imports the objects under different tabs. In this example the tabs are titled according to the type of file that is being imported as a group. For example, tab 1 is titled 'Text,' tab 2 is titled 'Images,' and tab 3 is titled 'Movies.'

In yet another example, the Editor keeps track of previously generated Binders and 'learns' how a user generally divides content and, in response, develops a tabbing pattern for future Binder layouts. Therefore, for example, if a teacher always titles the first tab as 'Assignment' then the default first tab presented in the generation of future Binders will be titled 'Assignment.'

Browsing the web is one of the most common ways to access information today. The difficulty arises when users want to use these online resources by importing them into the Binder for later use. Since most users are not going to have the BPS open every time they browse the web, it would be useful if there was some way to accumulate media spontaneously. Consequently, the Binder of an embodiment includes a client application that functions through the browser to allow users to drag or copy URLs or website links into the plug-in media repository. The client application then couples or connects with the BPS and transfers that information into a Binder Media Library. Then, when the user is ready to embed the content into a Binder, the information is cached in the Binder Media Library for future embedding into Binders. The Binder Media Library of an embodiment is a repository where all of the users' media objects and URLs are stored so that users can reuse material in other Binders. The Binder Media Library can organize media by private individual as well as by private and public Communities.

Binder authors will want the ability to create Binders when they do not have access to the online version of the BPS (such as on an airplane) or in cases where they want to keep their content on their local drives (confidential information). For this reason, with reference to FIG. 1, users can download a BPS Offline Editor 170. The UI and functionality of the Offline Editor 170 is similar to the online version described herein, except media objects are linked from the local hard drive. The Offline Editor application 170 caches all of the Binder information and content and automatically determines when the user is back online to upload all of the Binder data to their Binder account online. The BPS in response triggers a dialogue box that prompts the user if they want to upload the media to their Media folder. The user then has a backup version online as well as a copy of the offline version so that they can continue to edit the Binder when the coupling or connection to the Binder Server is available again. The Offline Editor 170 also allows a presenter to run media files such as video content from a local machine without having to worry about connectivity problems with the Binder Server.

The BPS of an embodiment includes or embeds a digital rights management component directly into the Binder. The BPS digital rights management component is an automated document index component (content management component) referred to as the Binder Auto Indexing System or Indexing System. The Indexing System automatically tracks all media objects that have been dragged and dropped, cut and pasted, and/or imported into the Binder application. The BPS system then uses a Credits tab to display the thumbnail image of the imported files and lists those file properties such as size, and type as well as the name of the file. The Credits tab also displays the date when the object was imported and from what file source it originated. An author can also provide additional information such as adding notes and modifying other information such as authorship or ownership, trademark, copyright dates, etc.; this is done through the Media Info component of the Editor. The metadata provided by the Media Info and indexing system is also used to refine user searches through the BPS search vehicle to find specific media clips that can be used in other Binders.

As mentioned above, the BPS Editor indexes all media content and generates a Credits tab in the Binder. Furthermore, the Binder Presentation provides a way to present index information directly from within the presentation without the aid of the Editor. This gives any viewer the opportunity to check references and resources for any media in the presentation they are viewing. Conventional media presentation tools do not provide a way to view all of the content used in the presentation; furthermore, most text, rich media and web documents do not provide a separate interface for embedded media objects.

For example, when using the Binder to organize material for a class presentation or assignment, a teacher can keep track of all the media files through the Binder Indexing interface referred to as the Credits tab or Index tab. The Credits tab provides the author with information of when content was imported, the source from where the content was imported from (e.g. website Uniform Resource Locator (URL), file directory, etc.), and/or copyright information of the content. Authors can further edit the Credits tab by inputting and editing information about the media in Media Info Box located from the menu bar of the Editor. In an embodiment of the Editor the author can input and edit the media information directly within the Credits page. The Credits page acts as summary layout of all of the Binder content and gives a birds-eye-view to the author.

The Indexing System is also similar to a word processing footnote feature except that the Binder automatically creates a Credits page of the entire media object imported in the Binder document, whereas the user of a word document is required to create a footnote referencing any point or copyright material in the body of text. The Binder Indexing System is particularly useful today when so many authors and presenters gather material from the Internet. A student for example can use the Binder to create a Binder rich media report using media found on the Internet. One of the issues surrounding use of the Internet is how teachers can enforce in students the importance of representing copyrighted material. The Binder Editor is configured to help authors account for media that has copyright information. In providing a Credits page as a template, and automatically inserting information of uploaded content into the Credits page, the Indexing System provides students the opportunity to remember to make appropriate reference logs to imported material by editing any information the Indexing System provides in the Credit's tab.

The Indexing System as described above provides a Document Index or Credits Tab that is displayed in the Binder and represents an index for all media, links and comments integrated with each media object included in the Binder. In one embodiment, the index information is represented on a single index page referred to as a Credits page or an Index page, and triggered by a Credits tab of the Binder.

The Credits page automatically tracks the source and other information of content uploaded into the Binder. The Credits page is an automated feature generated or created by the Editor, which, in one embodiment, highlights a list of the entire contents of the Binder along with the file properties, date imported, copyright, authorship and/or any additional notes about the media files used in the Binder. As an example, FIG. 11 shows a Credits page 1100 of a Binder, under an embodiment. The Credits page 1100 of this example includes information organized according to tab layers but is not so limited. The Credits page 100, for example, indicates that Tab 1 includes one image file (e.g. "Type") with one sub-tab (e.g. "Sub-tab 1"). The sub-tab content includes a text file (e.g. "Type") and spreadsheet file (e.g. "Type"). The sub-tab also includes a base-tab (e.g. "Base-tab 1") with a hyperlink to content of a remote web site (e.g. "www.google.com"). This Credits page 1100 allows the author to track the history of embedded content of the Binder and is a way for the audience to search for additional resource information such as copyright and the source from which the file was downloaded or copied. The Credits page 1100 is also a way for end-users to print or retrieve copies of embedded documents from within the Binder.

In contrast to the BPS, Microsoft PowerPoint, Excel and Word for example embed different media objects like video, images and graphs, but they do not provide an automated way to track where the media was imported from, nor do they provide a means to enter copyright and authorship information that is relevant to each piece of media content used in the document. Microsoft PowerPoint imports media objects like movies, graphs, Excel spreadsheets, sound and images. Once these objects are imported their original properties, where they were imported from, and the file name is lost to the author. Although you can cut and paste copies into other PowerPoint slides, you can not extract the properties of those objects from the PowerPoint application.

Other rich media documents like Macromedia's rich media Flash and Director Software do not provide an index of all the media used. The authoring environment will use a media directory that lists all of the media files that have been uploaded to the Flash authoring tool, but the details are not part of the final published Flash or Director files. In addition, most common web pages do not provide an index of all of the media and their properties used on a web page. There may be file names located in the page source view that is embedded in the html code when it references an object, but there is not a separate index page where an author or reader can view all of the media files being used and from where it was accessed, linked or stored from.

Adobe Acrobat provides something similar to an index page, but it is designed more as an attachment component of the application, similar to email attachments, where authors can attach external media files separate from the PDF document. Users click on objects in the 'Attachments' tab to launch the application outside of the PDF application reader—the Acrobat Reader.

Furthermore, the Acrobat 'Attachments' tab is not automated because it is designed as a way to let authors embed rich media clips, not conducive to print format. The 'Attachments' tab is a method for allowing Acrobat authors to attach external documents to their PDF file such as movie clips.

The BPS Editor automated indexing feature 1100 provides means for the system to keep track of all content that has been embedded in the Binder to help author's remember what media files were used and where it is located so that they can use them in another Binder presentation or document. This is based on the frustrations from teachers and other presenters who have used PowerPoint or created web documents and have a hard time relocating media associated with those documents. For example, a teacher may want to send a movie file to another teacher from a PowerPoint presentation that was created a year ago. In most cases, the teacher would have to remember the name of the movie clip and what folder the movie clip was stored in order to find the file. The teacher may end up sending the PowerPoint slide thinking that the movie clip would be attached to the slideshow but in fact, they would need to make sure a copy of the movie is also sent along with the presentation. This is a daunting task for many who aren't even familiar with the file directories or the search component on their operating system and part of the reason why digital presentations are troublesome for teachers who need to reuse material year after year. In our example, a teacher could retrieve the Binder used in the presentation and look to the index page to find out what file was used and where it is stored. This saves teachers an enormous amount of time looking for previously used content when all of it is made available by the BPS in the Binder Presentation document.

With transparency presentations, speakers often use opaque pieces of paper to block portions of a transparency in order to go through a series of points in a linear fashion. In the digital presentation method, PowerPoint for example uses transitions to reveal images or text on a page in some sort of sequential manner. However, if a user is not familiar with how to create transitions in the PowerPoint editor or wants to spontaneously hide a particular part of the content during a live presentation, it would be difficult. The user would have to turn off the projector, or minimize the file, instead, risking the chance to disengage the audience from the narrative flow. There currently is not a quick and seamless way to cover up the content projected from the computer.

Figure 12:
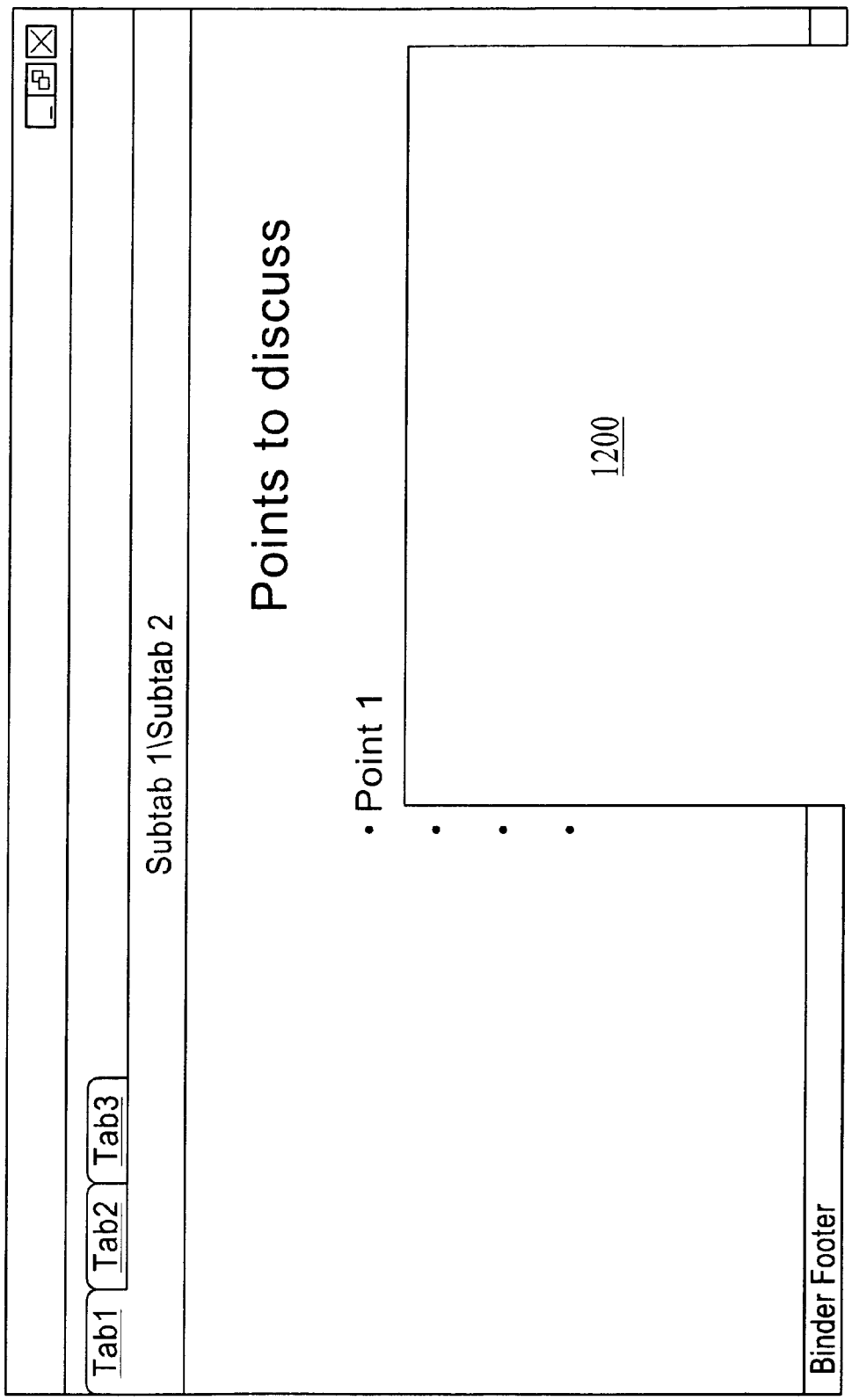
FIG. 12 shows a Binder in Tab mode with a Blocker, under an embodiment.
Figure 13:
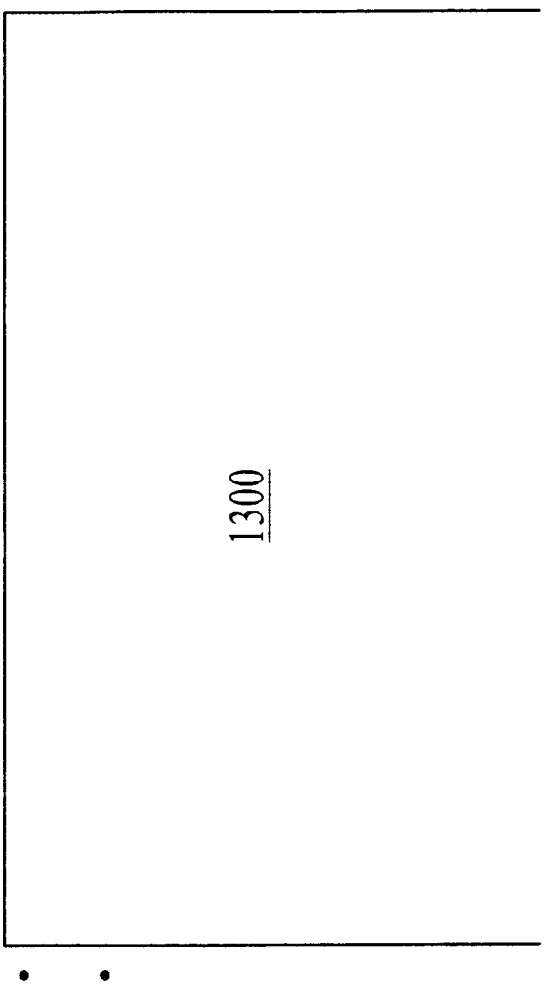
FIG. 13 shows a Binder in Presentation mode with a Blocker, under an embodiment.

The Binder of an embodiment overcomes this issue by providing a function that allows users to quickly and easily hide portions of the projected content from the viewer using a Blocker. The Blocker is a quick solution to covering up portions of a presentation slide without having to minimize the application or turn off the project. The Blocker mimics the transparent projector model where sheets of paper are used to block portions of a transparency slide as speakers work their way down a list of points on a transparency. The Blocker acts in a similar way on the computer. Users select a Blocker icon at the bottom of the Binder, which launches a separate blank window that users can move around to cover the contents of the selected tab page. For example, a teacher may have a list of bullet points that she wants to reuse. With a transparency projector she can use a sheet of paper to work her way down the list. Using the Binder she can launch the Blocker to cover each point on the list. She can do this in 'Tab' mode and in 'Presentation' mode. FIG. 12 shows a Binder in Tab mode with a Blocker 1200, under an embodiment. FIG. 13 shows a Binder in Presentation mode with a Blocker 1300, under an embodiment.

The Blocker is configured to allow users to move or drag the Blocker page to cover up portions or all of the contents presented on the tab page of the Binder. The Blocker is also configured to allow users to resize and/or reposition the Blocker. The Blocker facilitates a relatively quicker way to create digital presentations for the novice computer user who is familiar with using simple text transparencies. Furthermore, the Blocker is useful for any speaker who unexpectedly wants to cover the presentation content without having to shut down the projection device or minimize the presentation software. For a teacher who does not have the time to set up transitions, typing out bullet points and using the Blocker to work through those points is significantly faster. The BPS Binder blocking component is a simple and easy solution for spontaneously covering up portions of a presentation.

Figure 14:
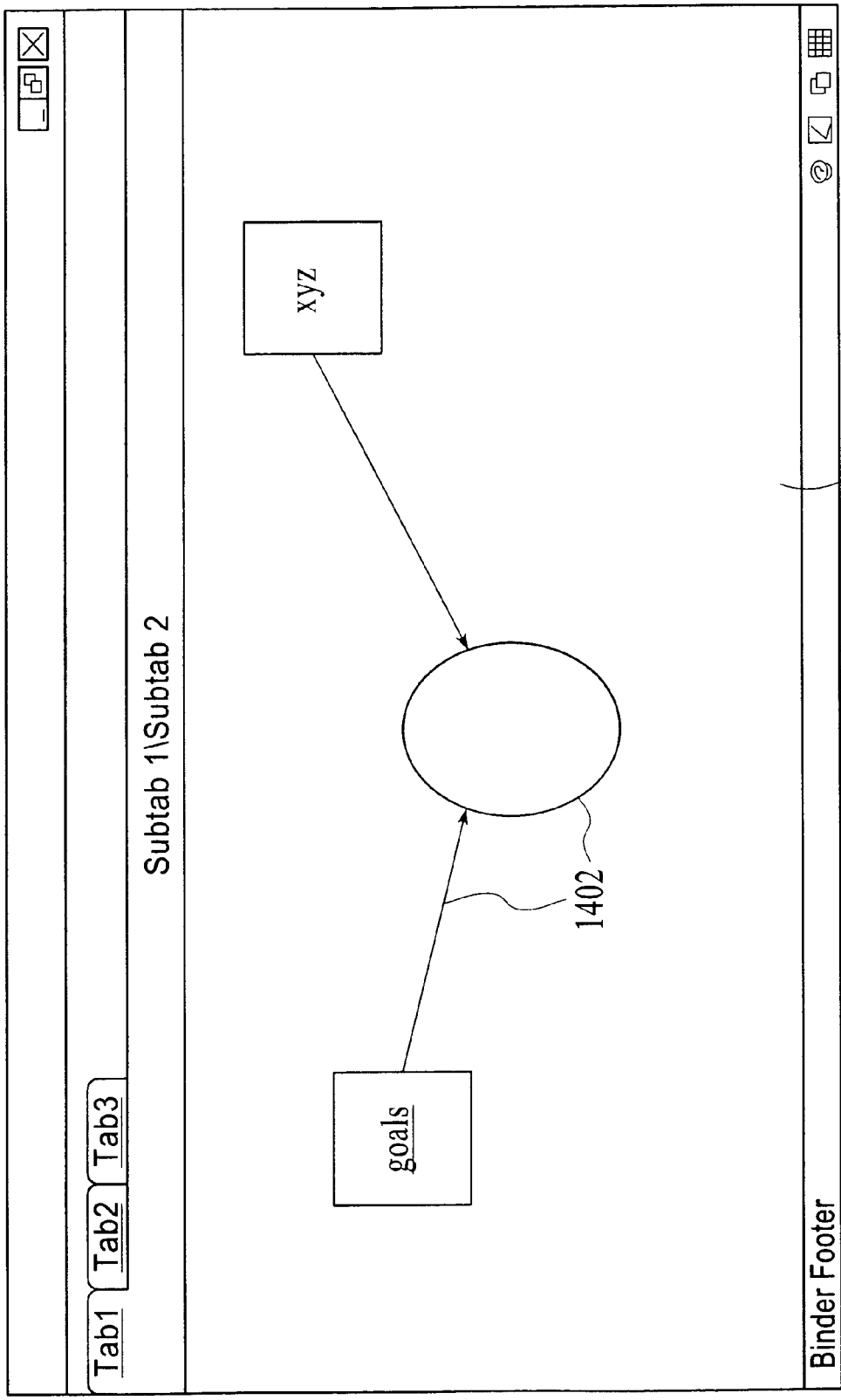
FIG. 14 shows an example Whiteboard of the BPS, under an embodiment.

A Whiteboard component of the Binder provides the ability to create drawings and diagrams through a whiteboard interface. Users can select an icon (e.g. Whiteboard icon) from the Binder in order to launch a separate tab page where they can draw objects, using the mouse to further enhance the presentation without having to leave the Binder application. FIG. 14 shows an example Whiteboard 1400 of the BPS, under an embodiment. The Whiteboard is useful during a presentation when the speaker wants to emphasize a point in the presentation with graphical notes. Instead of taking the time to walk to a whiteboard in the room, or if there is not one in the room, the speaker can launch the Whiteboard 1400 from within the Binder. The contents 1402 of the Whiteboard 1400 are either saved or removed the next time the user launches the Binder.

Company websites like Webex.com and Microsoft NetMeeting allow users to launch a separate drawing application usually in a window along side the PowerPoint presentation. From the users' perspective, the user would have to be in a Webex.com environment in order to access a whiteboard during a remote presentation or some other whiteboard component of the conferencing service. This takes time as the user becomes familiar with each new way to launch the whiteboard application, etc. While NetMeeting is linked within the application from the edit mode, it requires the user's client device to be specially configured to use NetMeeting. Therefore, if the user is launching a PowerPoint slide from an unfamiliar machine, they would be limited by the configuration of that machine.

The BPS is a solution to these issues because the Whiteboard 1400 is a component of the application and independent of a network configuration. The BPS is configured to launch the Whiteboard 1400 within the Binder document when it is selected. The Whiteboard 1400 is embedded in the Binder as a component of the presentation document so that the user can access the Whiteboard 1400 online, offline or remotely without having to depend on third party services or configuration requirements.

A Drawing component of the BPS allows a presenter to draw on top of the Binder in Tab mode or Presentation mode. This allows the user to add additional comments or drawings to the slideshow. The Drawing component functions as an annotation component of the Binder document so that the user can mark directly on the slides in either Tab mode or Presentation mode. The drawing component can be activated from the Tab mode by selecting a Drawing icon at the bottom of the panel as described below. Selection of the Drawing icon causes subsequent inputs via an input device of the client device to draw on the screen.

Figure 15:
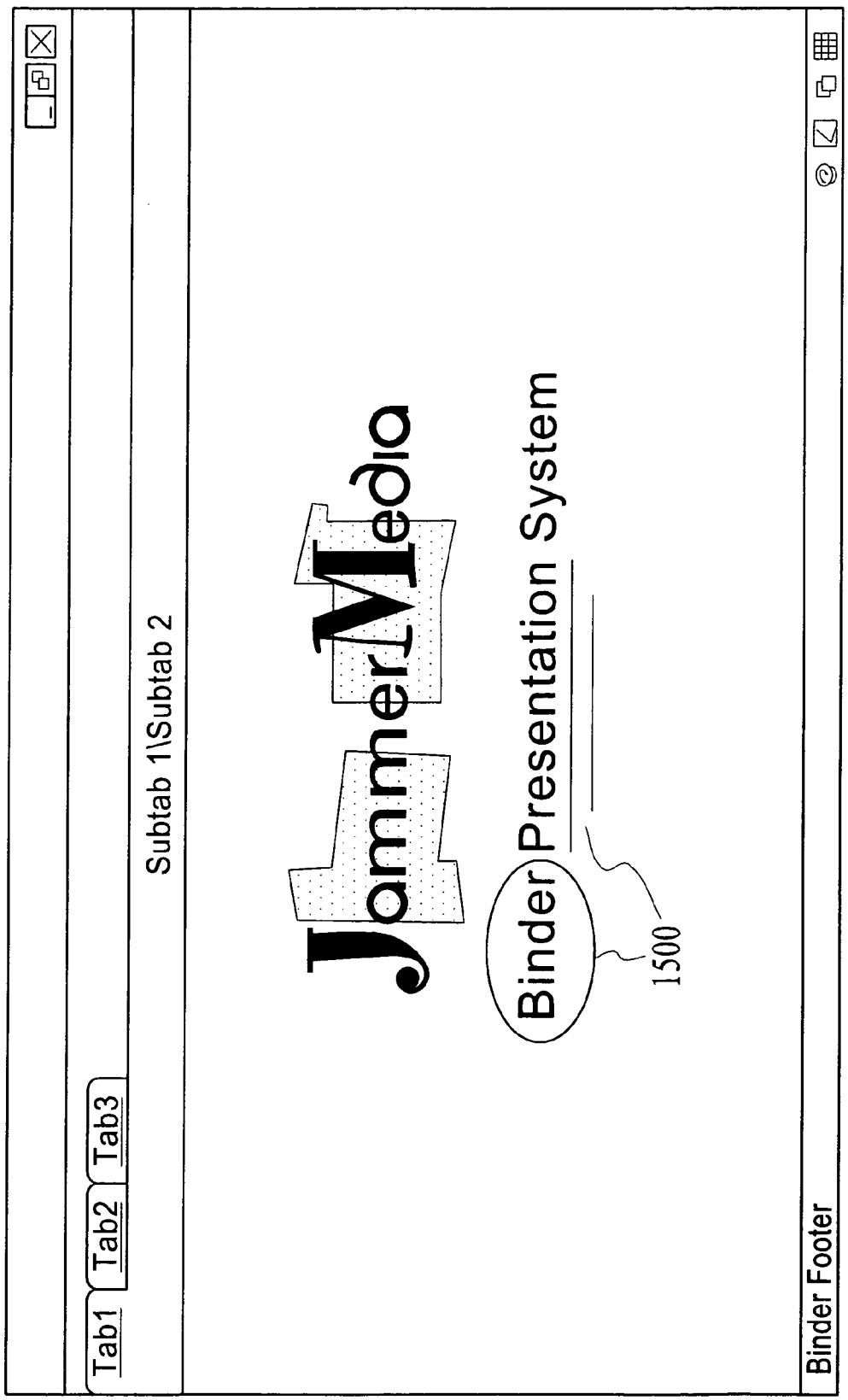
FIG. 15 shows an example Binder in Tab mode that includes annotations to the content made via the Drawing Component, under an embodiment.

FIG. 15 shows an example Binder in Tab mode that includes annotations 1500 to the content made via the Drawing Component, under an embodiment. The annotations 1500 of this example include a circle drawn around the word "Binder" along with two underlines drawn under the work "Presentation" but are not so limited.

Figure 16:
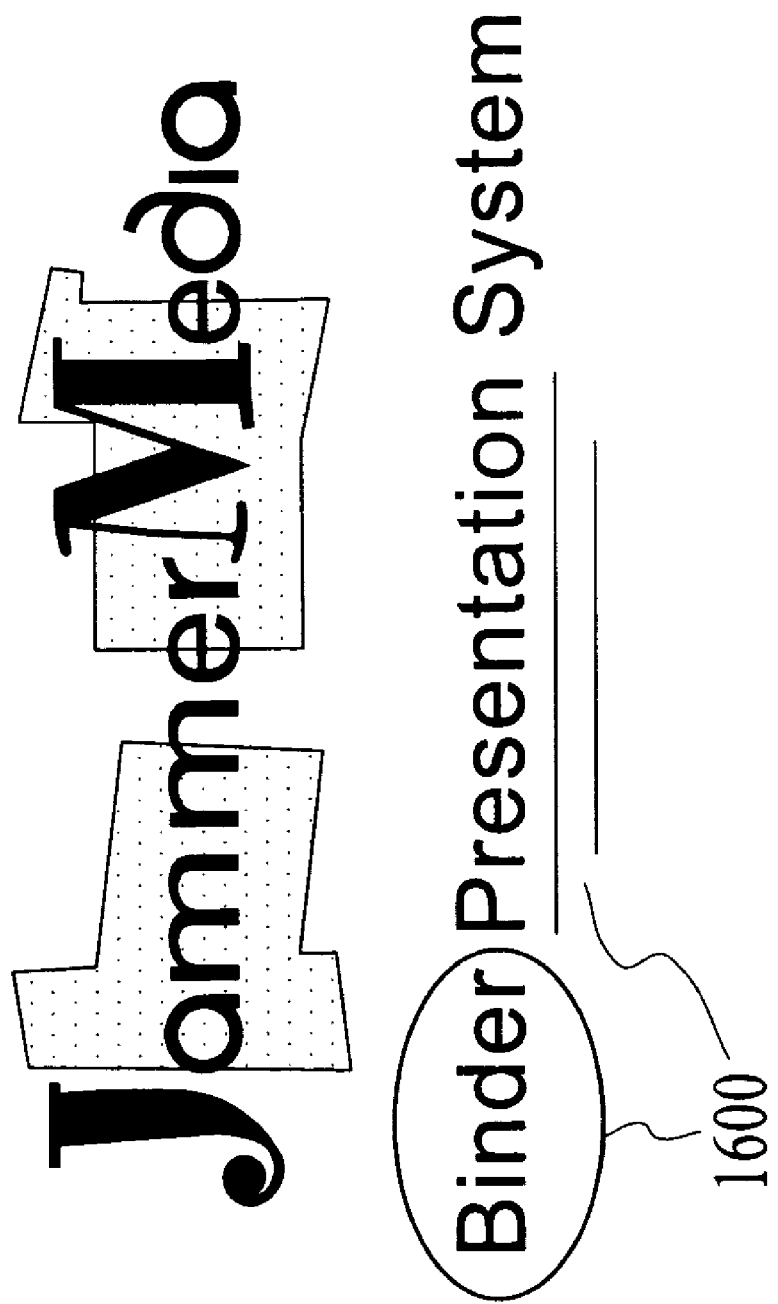
FIG. 16 shows an example Binder in Presentation mode that includes annotations to the content made via the Drawing Component, under an embodiment.

If the user moves into Presentation mode then the drawing feature remains active. FIG. 16 shows an example Binder in Presentation mode that includes annotations 1600 to the content made via the Drawing Component, under an embodiment. The annotations 1600 of this example include a circle drawn around the word "Binder" along with two underlines drawn under the work "Presentation" but are not so limited.

Figure 17:
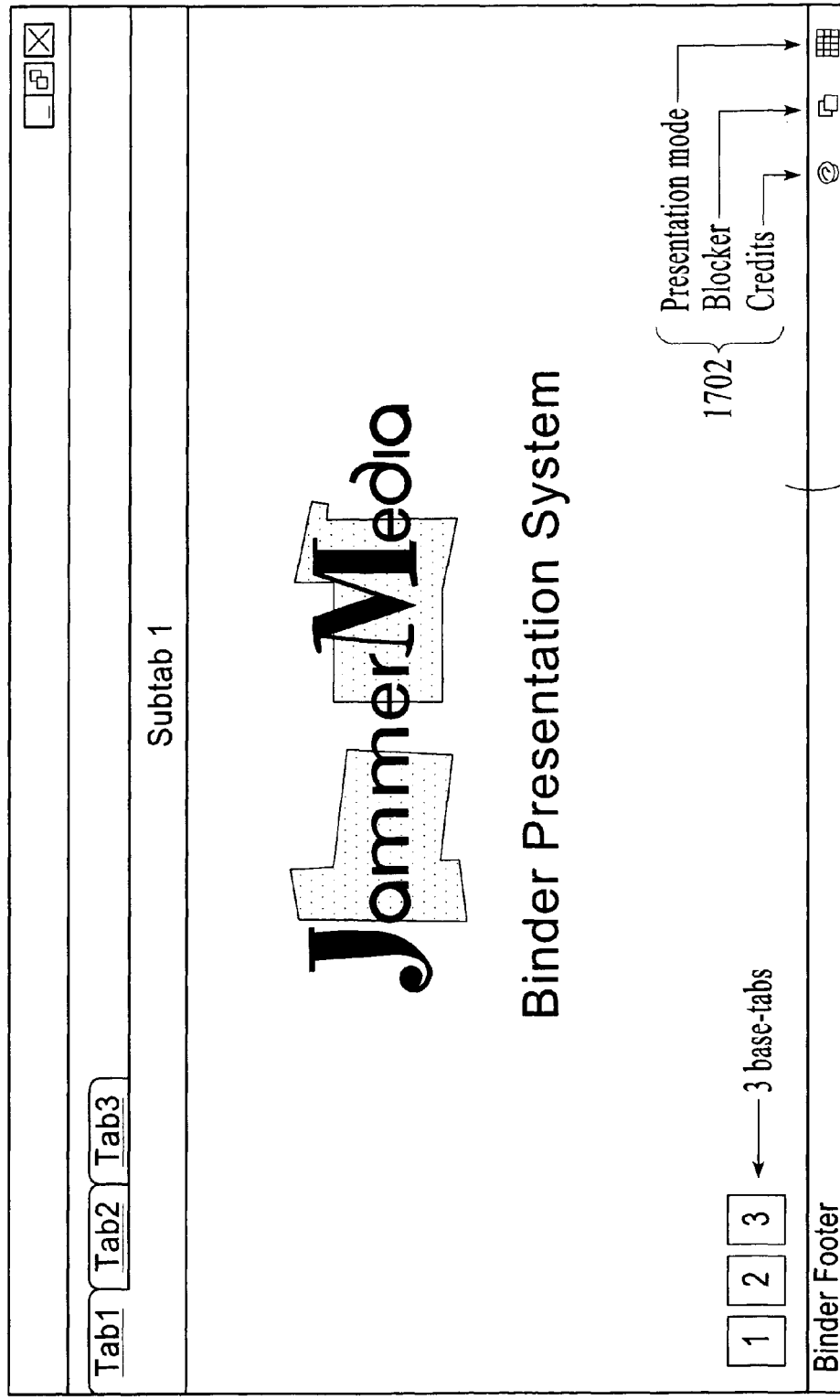
FIG. 17 shows a Binder in 'Tab' mode showing content of the main tab (e.g. Tab 1) and feature icons, under an embodiment.

Access to the BPS functions described above including the mode (e.g. Edit mode, Tab mode, Presentation mode), Credits, Blocker, Whiteboard, and Drawing functions is provided via selection of an icon or link of the BPS. FIG. 17 shows a Binder in Tab mode showing content 1700 of the main tab (e.g. Tab 1) and feature icons 1702, under an embodiment. The main tab content of this example is a title page that includes one sub-tab (e.g. "sub-tab 1"). The feature icons 1702 include a "Presentation mode" icon, a "Blocker" icon, and a "Credits" icon, but other icons can be provided as appropriate to the available BPS features. The Presentation mode icon places the Binder in Presentation mode from the current Tab mode. The Blocker icon activates the Blocker described above. The Credits icon displays the Credits page described above.

The BPS includes a configuration in which a registered user creates collaborative groups that can view, discuss, blog and co-edit Binders as described above. In one embodiment, there are two types of collaborations but the embodiment is not limited to two types of collaborations. The collaborations include Groups and Communities, each of which are described below.

A Group is created by a registered user and can have any number of members and share any number of Binders within the group. Groups further include Private and/or Public collaboration Groups and Communities from the BPS. A non-registered user can search and view all Public Binders organized by Categories or Public Communities. A registered user logged into the BPS can view their personal Binders, Public and Private, as well as Public Binders that are organized by Groups, Categories or Communities.

Registered users can also create Communities. In the Communities a user can create Private and/or Public groups. As an example, a school can be identified as a Community with many Groups attached to that Community. A user can belong to several Groups and/or Communities. By creating these Groups and Communities, a user can then invite members to collaborate on the editing of Binders or share particular Binders with a group of people. This would be a nice option for a teacher who wants to share Binders with different classrooms. A project leader in a business could set up Groups around different projects. A configuration of the BPS further allows a user to share Binders by sending an email, which attaches a link to the location of that Binder in the BPS; a user must be registered in order to view the Binder accessed via the received email link.

The online or web-based version of the Editor also provides collaborative authoring. Original authors edit their own Binders, but also have the option to share the editing with collaborators assigned by the original author. Because of the online nature of the BPS, users can share Binders in Edit mode. There are some scenarios when in the classroom or in business settings where groups need to collaborate on a presentation. Consequently, the BPS of an embodiment provides access to one Binder that updates entries automatically from all of the different users is a convenient way to work on a single document.

The BPS uses a version control system for keeping track of different versions of the Binder as each collaborator checks out the 'latest' version of the Binder to edit. Binders track input from different users along with the date and time when the Binder was checked in by the user. When a user goes to check out the latest version the version control indicates the latest entry made by the user, plus any additional entries since that version by the other collaborators. A final version will check to integrate any and all changes.

Without the BPS collaborative system, users would have to email versions of the document to all of the collaborators. If there are a number of large files associated with the presentation this can be a burden to the mail service system. In addition, if there are more than two collaborators this can get complicated as different versions are created at different times by different people.

A user can deliver a presentation using a Remote Control device of the BPS. The Remote Control device includes a separate window launched to the designated 'driver' or person controlling the presentation. The driver can then navigate through the presentation of the Binder via the Remote Control window, using the tabular interface (Tab mode) to move through the content. While the driver is navigating through the tabs, the audience is viewing the presentation in Presentation mode (without the tabs showing on the screen) and seeing the content as it is presented. This gives the driver full control over the presentation from either of a remote presentation space or the same presentation space as the viewer, thereby allowing her/him to jump among different tabs without having to reveal the tabs to the audience. This gives the speaker flexibility that does not exist today.

Conventional web applications like Thumbstack.com provide a remote control device to the designated driver, but only with a forward and backward arrow UI. These conventional applications are configured for a driver in a remote location and not as a way to navigate through a non-sequential order of slides. In contrast to the BPS, the conventional applications display the same presentation to the driver and the audience making it difficult for the driver to jump among slides without creating a disruptive user experience as a result of the viewers watching the progression of slides.

Components of the BPS can couple to other components not shown in the figures herein. While the term "components" is generally used herein, it is understood that "components" include circuitry, components, modules, and/or any combination of circuitry, components, and/or modules as the terms are known in the art. While various components shown herein may be depicted as co-located, the embodiment is not to be so limited; the BPS of various alternative embodiments may distribute one or more functions provided by any described component among any number and/or type of components, modules, and/or circuitry.

While one of each of the components comprising the BPS is shown, various alternative embodiments include any number and/or combination of each of these components coupled in various configurations known in the art. Further, while the components of the BPS are shown as separate blocks, some or all of these blocks can be monolithically integrated onto a single chip, distributed among a number of chips or components of a host system, and/or provided by some combination of algorithms. The term "processor" as generally used herein refers to any logic processing unit, such as one or more CPUs, digital signal processors ("DSP"), application-specific integrated circuits ("ASIC"), etc.

The actual configuration of the BPS is as appropriate to the components, configuration, functionality, and/or form-factor of a host system; the couplings shown between components of the BPS therefore are representative only and are not to limit the BPS to the configuration shown. The BPS can be implemented in any combination of software algorithm(s), firmware, and hardware running on one or more processors, where the software can be stored on any suitable computer-readable medium, such as microcode stored in a semiconductor chip, on a computer-readable disk, or downloaded from a server and stored locally at the host device for example.

The BPS can couple among any combination of other components under program or algorithmic control, these other components including processors, memory devices, buses, controllers, input/output devices, communication systems, and displays to name a few. A coupled database may include any number, type, and/or combination of memory devices, including read-only memory ("ROM") and random access memory ("RAM"), but is not so limited.

Aspects of the media management systems described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the media management systems include: microcontrollers with memory (such as electronically erasable programmable read-only memory (EEPROM)), embedded microprocessors, firmware, software, etc. Furthermore, aspects of the media management systems may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that components of the various systems and methods disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described systems and methods may be processed by a processing entity (e.g., one or more processors) within the computer system in conjunction with execution of one or more other computer programs.

Unless the context clearly requires otherwise, throughout the description, the words "comprise", "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the media management systems is not intended to be exhaustive or to limit the systems and methods described to the precise form disclosed. While specific embodiments of, and examples for, the media management systems are described herein for illustrative purposes, various equivalent modifications are possible within the scope of other media management systems and methods, as those skilled in the relevant art will recognize.

The teachings of the media management systems provided herein can be applied to other processing systems and methods, not only for the systems and methods described above.

The elements and acts of the various embodiments described above can be combined to provide further embodiments. These and other changes can be made to the media management systems in light of the above detailed description.

In general, in the following claims, the terms used should not be construed to limit the media management systems to the specific embodiments disclosed in the specification and the claims, but should be construed to include all systems that operate under the claims. Accordingly, the media management systems are not limited by the disclosure, but instead the scope of the media management systems is to be determined entirely by the claims.

While certain aspects of the media management systems are presented below in certain claim forms, the inventors contemplate the various aspects of the media management systems in any number of claim forms. Accordingly, the inventors reserve the right to add additional claims after filing the application to pursue such additional claim forms for other aspects of the media management systems.

What is claimed is:

1. A method for creating and sharing binder documents, the method comprising:
   providing a binder presentation system (BPS) web application at a remote server which includes a computer readable medium and processor, wherein the BPS web application is operable to communicate with a plurality of clients to create, manage and present binder documents;
   receiving a first request at the BPS from a client to create a binder document, wherein the binder document is a multi-level tabbed and subtabbed document, which includes a plurality of web-based media content that is organized by the client, wherein each tab and subtab shows a different page of the binder document, and wherein the plurality of web-based media content is stored remotely and is accessible via an internet;
   receiving a second request from the client to add particular web-based media content to the binder document, wherein the request includes a uniform resource locator (URL) for the particular web-based media content and indicates a location, in the binder document, to add the particular web-based media content;
   integrating the particular web-based media content into the binder document at the location indicated by the second request;
   automatically generating an electronic index of the plurality of web-based media content in the binder document, wherein for each of the plurality of web-based media content, the electronic index includes metadata received from a media info component, wherein the metadata includes one or more of a URL associated with that web-based media content, authorship information for that web-based media content and rights regulating use of that web-based media content, wherein the electronic index is integrated into the binder document as one of the tabs; and
   hosting the binder document over the internet where it can be accessed through the remote server.

2. The method of claim 1, further comprising receiving local media content into the binder document from a local source, wherein the local media content from the local source is generated at the local source and uploaded from the local source to the remote server such that it can be accessed over the internet.

3. The method of claim 2, wherein a URL is generated for the local media content when it is uploaded from the local source to the remote server.

4. The method of claim 1, comprising receiving the web-based media content via user action through a user interface (UI), wherein the UI is web-based.

5. The method of claim 1, comprising receiving the web-based media content via user action through a remote UI of a client, wherein the web-based media content is automatically uploaded into the binder document upon subsequent coupling of the client to a host device of the binder document.

6. The method of claim 1, wherein the integrating includes embedding the particular web-based media content into a tab or a subtab of the binder document.

7. The method of claim 1, wherein the integrating includes embedding an electronic link to the particular web-based media content in the binder document, wherein the web-based media content is hosted by a remote device.

8. The method of claim 1, further comprising:
   automatically converting different types of the web-based media content into a set of media objects; and
   automatically labeling the media objects with a corresponding automatically generated tab.

9. The method of claim 8, wherein the automatically converting and automatically labeling is performed by a rules-based system.

10. The method of claim 1, comprising tracking the web-based media content of the binder document in the electronic index, the tracking comprising updating the electronic index in response to addition and deletion of web-based media content of the binder document.

11. The method of claim 10, comprising using the electronic index to create an interactive table of contents template tab in the binder document, wherein a plurality of tabs comprise the interactive table of contents template tab.

12. The method of claim 1, comprising generating a window to cover one or more portions of displayed web-based media content, wherein the window is an electronic window that is reconfigurable in size and position, and wherein the one or more portions of the displayed web-based media include text.

13. The method of claim 1, comprising displaying the web-based media content of the binder document via a user interface (UI).

14. The method of claim 1, comprising displaying the web-based media content of the binder document in response to user selection of one of the tabs and subtabs.

15. The method of claim 1, wherein the plurality of web-based media content comprises a plurality of media types including digital media including one or more of text, images, audio, video, multimedia presentations, slide presentations, and dynamic content.

16. The method of claim 15, wherein the dynamic content includes electronic mail, instant messaging, Really Simple Syndication (RSS) feeds, map requests, searches, surveys, electronic games, video content streamed from a remote device, and learning modules.

17. The method of claim 1 wherein the binder document comprises two levels of tabs which includes at least one tab that includes at least one subtab.

18. The method of claim 1 wherein the binder document comprises three levels of tabs which includes at least one tab that has at least one subtab, and wherein the at least one subtab further includes at least one additional subtab.

19. A system comprising:
  a remote server which includes a computer readable medium and processor, wherein the remote server is coupled to an enterprise and a communication network and is accessible to a plurality of clients;
  a binder presentation system (BPS) web application executing at the remote server, wherein the BPS web application is operable to communicate with the plurality of clients to create, manage and present binder documents;
  a plurality of binder documents, accessible through the BPS, wherein each binder document is a multi-level tabbed and subtabbed document which includes a plurality of web-based media content that is organized by the client, wherein each tab and subtab shows a different page of the binder document, and wherein the plurality of web-based media content is stored remotely and accessible via an internet;
  wherein particular web-based media content can be added to one of the binder documents, by a client, by using a uniform resource locator (URL) for the particular web-based media content and by indicating a location, in that binder document, to add the particular web-based media content, and wherein the particular web-based media content is integrated into the binder document at the location indicated;
  an automatically generated electronic index, for each of the binder documents, of the plurality of web-based media content in each binder document, wherein for each of the plurality of web-based media content in one of the binder documents, the electronic index for that binder document includes metadata received from a media info component, wherein the metadata includes one or more of a URL associated with that web-based media content, authorship information for that media content and rights regulating use of that web-based media content, wherein each electronic index is integrated into its binder document as one of the tabs; and
  wherein each binder document is hosted over the internet where it can be accessed through the remote server.

20. The system of claim 19, wherein the BPS web application further receives local media content into the binder document from a local source, wherein the local media content from the local source is generated at the local source and uploaded from the local source to the remote server such that it can be accessed over the internet.

21. The method of claim 20, wherein a URL is generated for the local media content when it is uploaded from the local source to the remote server.

22. The system of claim 19, wherein the BPS web application receives the web-based media content via user action through a user interface (UI) that includes a web browser.

23. The system of claim 19, wherein the BPS web application receives the web-based media content in response to user action through a remote UI of a client, wherein the web-based media content is automatically uploaded into the binder document upon subsequent coupling of the client to a host device of the binder document.

24. The system of claim 19, wherein when the particular web-based media content is integrated the binder document, the particular media content is embedded into a tab or a subtab of the binder document.

25. The system of claim 19, wherein when the particular web-based media content is integrated into the binder document, an electronic link to the particular web-based media content is embedded in the binder document, wherein the particular web-based media content is hosted by a remote device.

26. The system of claim 19, wherein different types of the plurality of web-based media content is automatically converted into a set of media objects, and the set of media objects are automatically labeled with a corresponding automatically generated tab.

27. The system of claim 26, wherein automatically converting and automatically labeling is performed by a rules-based system.

28. The system of claim 19, wherein the BPS web application tracks the web-based media content of the binder document in the electronic index by updating the electronic index in response to addition and deletion of web-based media content of the binder document.

29. The system of claim 19, wherein the BPS web application generates a window to cover one or more portions of displayed web-based media content, wherein the window is an electronic window that is reconfigurable in size and position, and wherein the one or more portions of the displayed web-based media include text.

30. The system of claim 19, wherein the BPS web application displays the web-based media content of the binder document via a UI.

31. The system of claim 19, wherein the BPS web application displays the web-based media content of the binder document in response to user selection of one of the tabs and subtabs.

32. The system of claim 19, wherein the plurality of web-based media content comprises a plurality of media types including digital media including one or more of text, images, audio, video, multimedia presentations, slide presentations, and dynamic content, wherein the dynamic content includes electronic mail, instant messaging, Really Simple Syndication (RSS) feeds, map requests, searches, surveys, electronic games, video content streamed from a remote device, and learning modules.

33. A computer readable storage medium including executable instructions which when executed in a processing system cause the processing system to perform the steps of:
  providing a binder presentation system (BPS) web application at a remote server which includes a computer readable medium and processor, wherein the BPS web application is operable to communicate with a plurality of clients to create, manage and present binder documents;
  receiving a first request at the BPS from a client to create a binder document, wherein the binder document is a multi-level tabbed and subtabbed document which includes a plurality of web-based media content that is organized by the client, wherein each tab and subtab shows a different page of the binder document, and wherein the plurality of web-based media content is stored remotely and is accessible via an internet;
  receiving a second request from the client to add particular web-based media content to the binder document, wherein the request includes a uniform resource locator (URL) for the particular web-based media content and indicates a location, in the binder document, to add the particular web-based media content;
  integrating the particular web-based media content into the binder document at the location indicated by the second request;
  automatically generating an electronic index of the plurality of web-based media content in the binder document, wherein for each of the plurality of web-based media content, the electronic index includes metadata received from a media info component, wherein the metadata includes one or more of a URL associated with that web-based media content, authorship information for that web-based media content and rights regulating use of that web-based media content, wherein the electronic index is integrated into the binder document as one of the tabs; and hosting the binder document over the internet where it can be accessed through the remote server.

34. The method of claim 1, further comprising automatically organizing the binder document in an account of a user, the organizing comprising organizing according to at least one of title, date, category, description, tags and frequency of viewing of the document.

35. The method of claim 34, wherein the account of the user comprises a plurality of binder documents organized by the user on one or more binder shelves.

36. The method of claim 34, comprising copying the binder document from the account of the user to another account of another user.

37. The method of claim 34, comprising electronically sharing with another user the binder document in the account.

38. The method of claim 34 further comprising collaborating with at least one other user, such that the at least one other user accesses and edits the binder document in the account.

\* \* \* \* \*